US005459548A

United States Patent [19]

Matsuda et al.

[11] Patent Number: 5,459,548

[45] Date of Patent: Oct. 17, 1995

[54] INFORMATION FORMING APPARATUS WITH MECHANISM FOR UNSEALING AND SEALING A COVER OF RECORDING MATERIAL

[75] Inventors: Naoyuki Matsuda, Sagamihara; Yukiyoshi Yamakoshi, Hadano; Hajime Takei, Sagamihara; Fuminori Moro, Machida; Hiroshi Tomita, Sagamihara, all of Japan; Richard R. Lemberger, Columbus Township, Anoka County, Minn.; Terrence H. Joyce, Lakeville, Minn.; Paul C. Schubert, Marine on St. Croix, Minn.

[73] Assignees: Minolta Co., Ltd., Osaka, Japan; Minnesota Mining and Manufacturing Company, St. Paul, Minn.

[21] Appl. No.: 247,496

[22] Filed: May 23, 1994

Related U.S. Application Data

[63] Continuation of Ser. No. 104,811, Aug. 10, 1993, abandoned, which is a continuation of Ser. No. 825,511, Jan. 24, 1992, abandoned, which is a division of Ser. No. 480,105, Feb. 14, 1990, abandoned.

[30] Foreign Application Priority Data

Feb. 17, 1989 [JP] Japan .................................... 1-37957
Feb. 17, 1989 [JP] Japan .................................... 1-37958

[51] Int. Cl.$^{6}$ .................................................. G03B 27/58

[52] U.S. Cl. ........................... 355/72; 271/145; 354/275

[58] Field of Search ...................... 355/72, 311; 354/275, 354/276, 277; 206/455, 467, 578; 271/145

[56] References Cited

U.S. PATENT DOCUMENTS

| | | | |
|---|---|---|---|
| 3,495,759 | 2/1909 | Bergstrom et al. | 206/46 |
| 4,519,522 | 5/1985 | McElwee | 221/13 |
| 4,621,272 | 11/1986 | Toriumi et al. | 354/275 X |
| 4,727,391 | 2/1988 | Tajima et al. | 354/277 |
| 4,860,042 | 8/1989 | Tajima et al. | 354/277 |
| 4,876,706 | 10/1989 | Tajima | 354/277 X |
| 4,912,510 | 3/1990 | Ogura et al. | 355/72 X |
| 4,947,472 | 8/1990 | Maeda | 355/72 |
| 5,021,824 | 6/1991 | Higashi et al. | 355/72 |

FOREIGN PATENT DOCUMENTS

| | | |
|---|---|---|
| 0250851 | 1/1988 | European Pat. Off. . |
| 2144653 | 9/1971 | Germany . |
| 57-38669 | 8/1982 | Japan . |
| 62-205340 | 9/1987 | Japan . |
| 63-11936 | 1/1988 | Japan . |
| 63-218382 | 1/1989 | Japan . |

*Primary Examiner*—Fred L. Braun
*Attorney, Agent, or Firm*—Willian Brinks Hofer Gilson & Lione

[57] ABSTRACT

An image forming apparatus that can be charged with a sheet cassette with a resealable flexible cover includes a roller member engageable with and translatable across the cover to wind the cover on the roller member. The size of the sheet material accommodated in the sheet cassette can be determined from a bar code and the movement of the roller member can be adjusted in accordance with the size of the sheet material. Timers can be set to provide predetermined time periods relative to the translating opening and closing movement of the roller member and, if these time periods expire, an indicator can be provided to the operator.

20 Claims, 18 Drawing Sheets

Fig. 13a
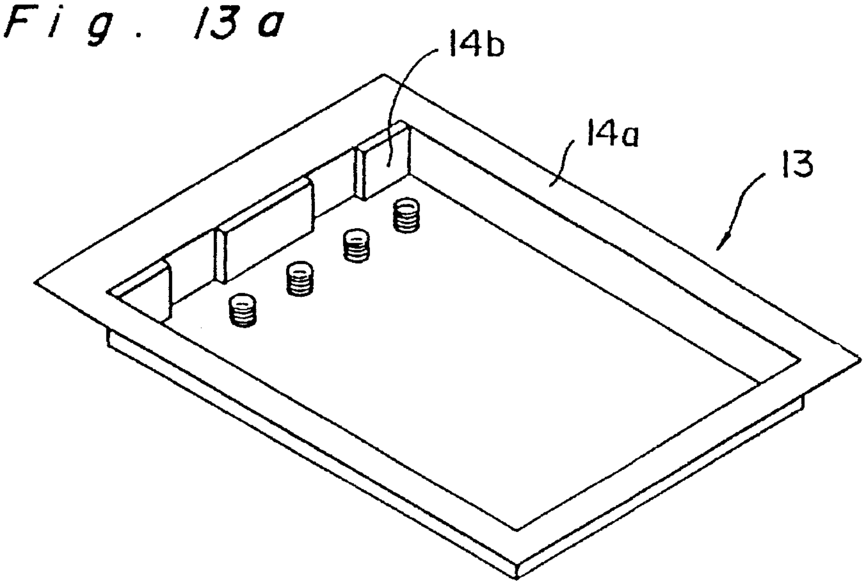
Fig. 13b
Fig. 13c
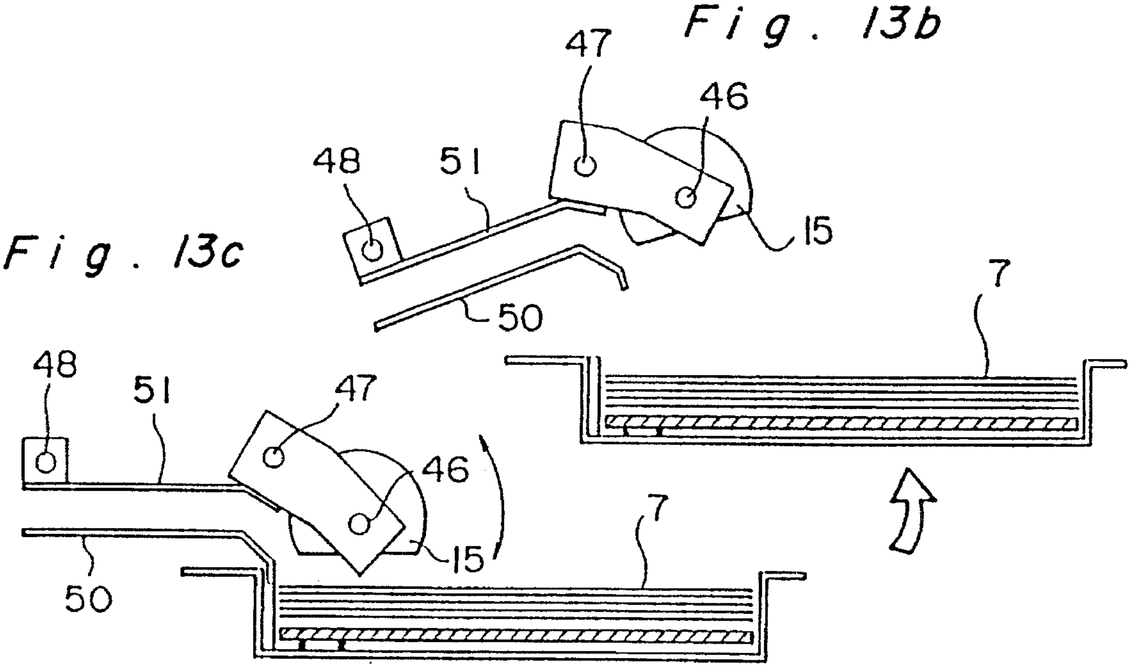
Fig. 13d
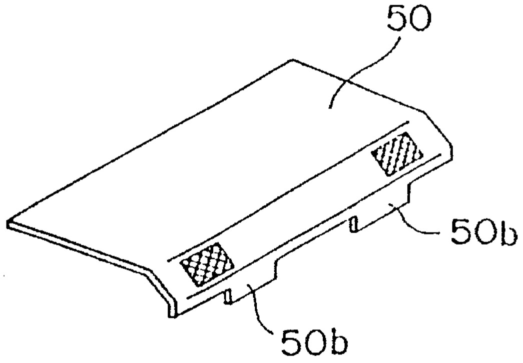

INFORMATION FORMING APPARATUS WITH MECHANISM FOR UNSEALING AND SEALING A COVER OF RECORDING MATERIAL

This application is a continuation of application Ser. No. 08/104,811, filed on Aug. 10, 1993, now abandoned, which in turn is a continuation of application Ser. No. 07/825,511, filed on Jan. 24, 1992, now abandoned, which in turn is a division of application Ser. No. 07/480,105, filed on Feb. 14, 1990, now abandoned.

BACKGROUND OF THE INVENTION

1. Field of the Invention

The present invention relates to an image forming apparatus for forming images by the use of sheet materials and to a sheet cassette for use in such an image forming apparatus.

2. Description of the Prior Art

Japanese Patent Laid-open Application No. 63-11936 discloses a film cassette for use in a printer or the like. When the film cassette accommodating a plurality of sheet films has been charged into, for example, a printer, an end portion of a cover of the cassette protrudes out of the printer. The cassette can be opened by manually drawing the end portion for separation of the cover from the cassette. As a result, the cassette can feed the sheet films sheet by sheet under vacuum.

However, after the cover has once been removed from the cassette, it is impossible to cover the cassette with the cover again or to apply the cover onto the cassette. Accordingly, it is substantially impossible to perform the printing using films different in size from those accommodated in the cassette. In such a case, the cassette must be once removed from the printer and replacement of films is required.

In particular, when the films are made of a photosensitive material or materials, the film replacement must be conducted in a darkroom. This work is considerably troublesome.

SUMMARY OF THE INVENTION

It is accordingly an object of the present invention to provide an improved sheet cassette overcoming the above-described disadvantage inherent in the prior art film cassettes, and an image forming apparatus in which this sheet cassette can be preferably employed.

Another important object of the present invention is to provide a sheet cassette having a cover for covering an opening of the sheet cassette, which opening can be repeatedly opened or closed by the cover.

A further object of the present invention is to provide a disposable sheet cassette of the above-described type suited for use in an image forming apparatus in which troublesome sheet replacement is not required.

A still further object of the present invention is to provide an image forming apparatus employing therein a sheet cassette, an opening of which can be repeatedly opened or closed by a cover.

In accomplishing these and other objects, a sheet cassette according to the present invention comprises a container capable of accommodating a plurality of sheet materials and having a flange portion, an adhesive layer formed on the flange portion, and a sheet cover bonded on the adhesive layer for covering an opening of the sheet cassette. A portion of the sheet cover can be repeatedly separated from or applied to the adhesive layer to open or close the opening.

The sheet cassette according to the present invention can be opened when the sheet materials accommodated therein are required to be fed for the printing in an image forming apparatus such as a printer or the like and can be closed by the sheet cover when the sheet cassette is removed from the image forming apparatus. Accordingly, even if the sheet materials are made of a photosensitive material or materials, a sheet cassette can be readily replaced by another cassette without requiring a dark room environment.

Furthermore, according to the present invention, the sheet cassette can be completely shielded from light by making the traveling speed of a take-up roller for winding the sheet cover greater than the rotating speed of the take-up roller.

The present invention is also directed to an image forming apparatus employing therein a sheet cassette of the above described type and comprising take-up means movable above the sheet cover for winding the sheet cover, support means for rotatably supporting the take-up means, a driving mechanism for moving the support means and for rotating the take-up means, and control means for operating the driving mechanism so that the take-up means can wind the sheet cover after the sheet cassette has been charged in the apparatus. The take-up means together with the support means moves in a direction longitudinally of the sheet cassette when the sheet cover is wound around the take-up means.

In another aspect of the present invention, an image forming apparatus comprises take-up means movable above the sheet cover for winding the sheet cover, support means for rotatably supporting the take-up means, a driving mechanism for moving the support means and for rotating the take-up means, means for detecting that the take-up means is located at a position where the take-up means is allowed to start winding, and control means for moving the take-up means to the position so that the take-up means is caused to start winding when the detecting means cannot detect the take-up means even after the sheet cassette has been charged in the apparatus.

Since the image forming apparatus is constructed as described above, the foregoing sheet cassette is available thereto.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein:

FIGS. 13*a* to 13*d* are perspective views or side views indicative of the relationship between the film cassette and the film feed mechanism;

DETAILED DESCRIPTION OF THE PREFERRED EMBODIMENTS

Figure 1:
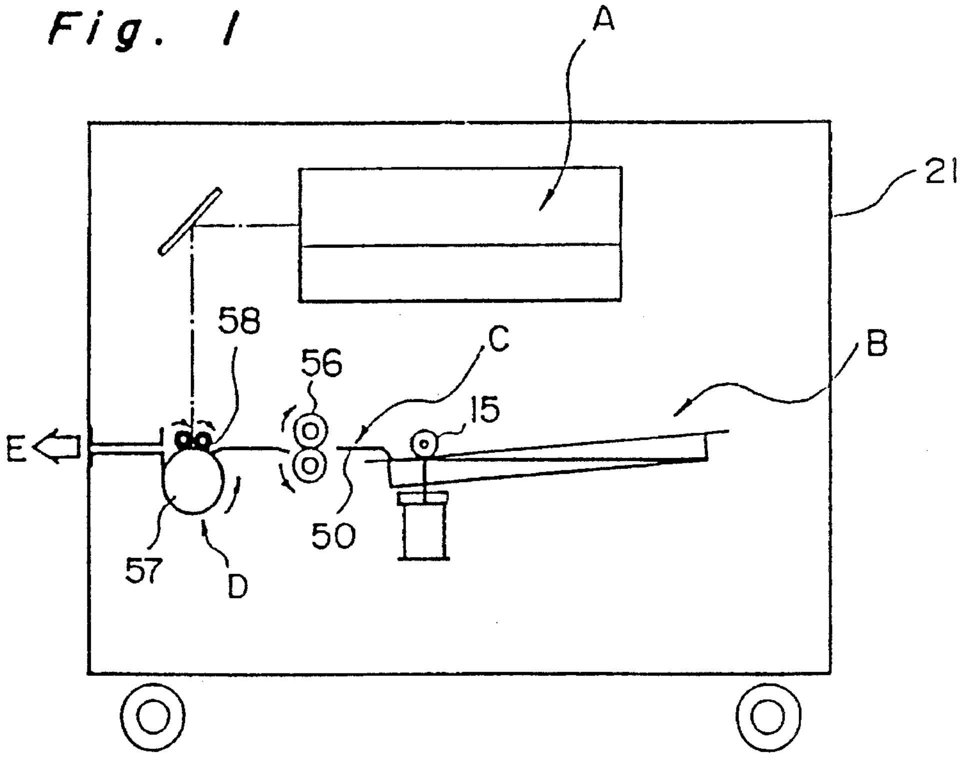
FIG. 1 is a schematic side view of a printer, in which a film cassette according to the present invention is used.

Referring now to the drawings, there is schematically shown in FIG. 1 a printer 21 employing therein a film cassette according to the present invention. The printer 21 is internally provided at its upper portion with an optical recording device A including a laser source for forming images. The printer 21 is further internally provided with a cassette portion B accommodating sensitized films, a film transport portion C comprised of a pair of transport rollers 56, a guide plate 50 etc. and a sub-scanning portion D comprised of a scanning drum 57, two nip rollers 58 etc. The cassette portion B, the film transport portion C and the sub-scanning portion D are disposed below the optical recording device A. In this printer 21, a film accommodated in the cassette portion B is substantially horizontally fed by a feed roller assembly 15 towards the sub-scanning portion D in which the film is exposed to laser beams emitted from the optical recording device A. The film is then introduced to a developing portion E (not shown) in which the film is developed for image formation.

Figure 2:
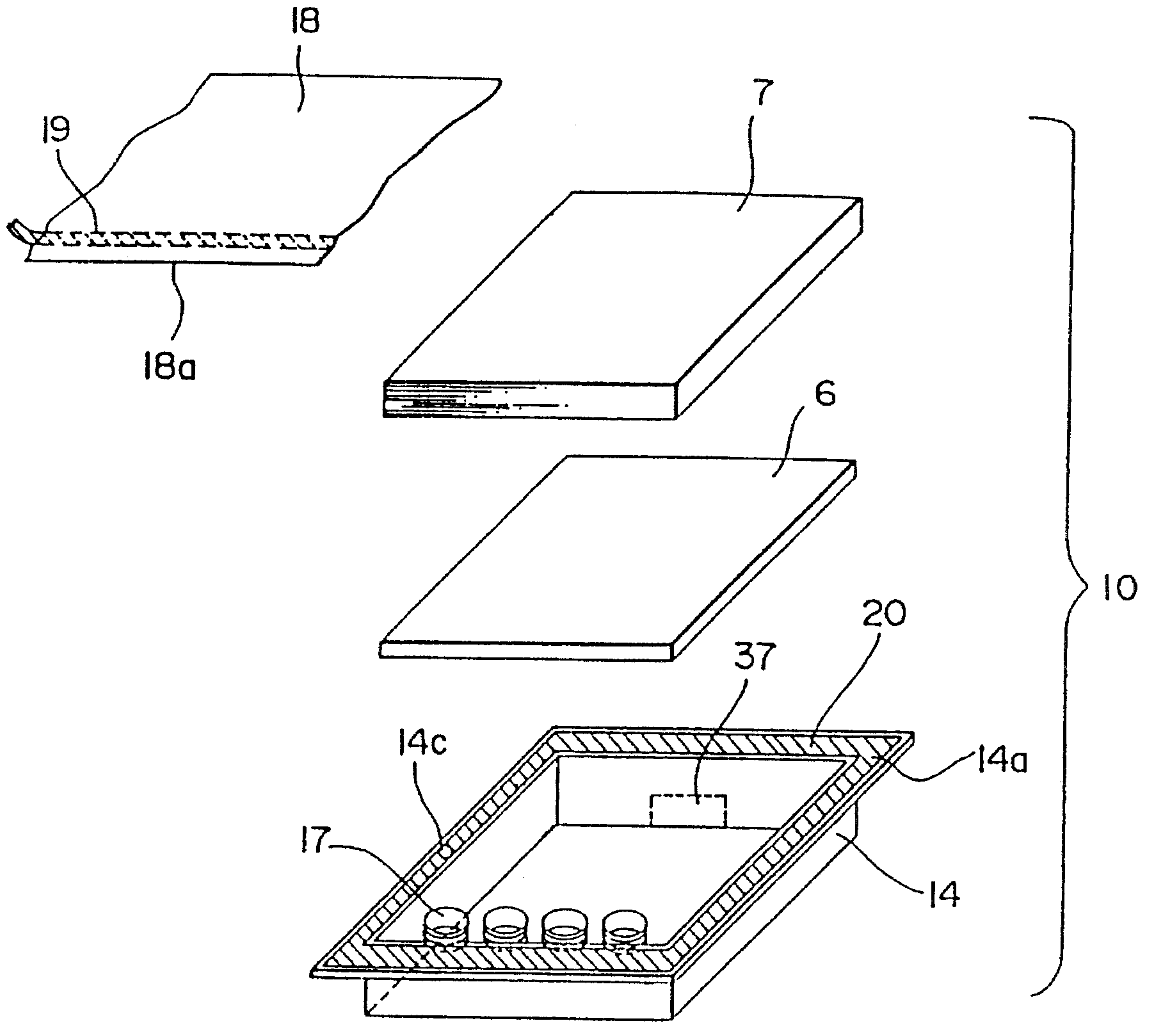
FIG. 2 is an exploded perspective view of a film cassette to be used in the printer of FIG. 1.
Figure 3:
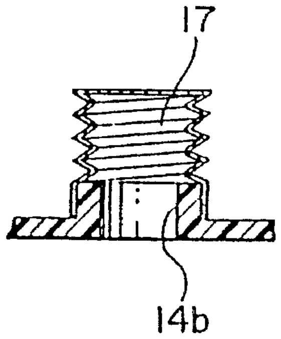
FIG. 3 is a sectional view, on an enlarged scale, of a bellow mounted on one of projections formed at a front bottom portion of a cassette box of the film cassette of FIG. 2.

FIG. 2 depicts a disposable film cassette 10 before assembling, which can accommodate a plurality of sensitized films and is charged into the printer 21. A cassette box 14, which is opened on its upper side, is made of light shielding plastic, ABS resin or the like in the form of a rectangular parallelepiped. The cassette box 14 is provided with a flange 14*a* integrally formed therewith and extending outwards therefrom. As shown in FIG. 3, a bellow 17 of light shielding vinyl is securely mounted on each of four projections formed at a front bottom portion of the cassette box 14. Each projection has a through-hole 14*b* at its central portion, through which one of lifting rods 5 of a film lifting device extends for keeping the height of films constant. The film lifting device will be explained later. A cassette cover 18 made of light shielding sheet of vinyl, polyester resin or the like is bonded on a double-sided adhesive tape 20 which has been bonded on the upper surface of the flange 14*a* of the cassette box 14 in advance. It is designed that the adhesive force between the adhesive tape 20 and the flange 14*a* of the cassette box 14 is always greater than the adhesive force between the adhesive tape 20 and the cassette cover 18. Accordingly, whenever the cassette cover 18 is separated from the cassette box 14, the adhesive tape 20 remains on the cassette box 14 without fail. An adhesive tape manufactured by NITTO DENKO CORPORATION and named "double-sided adhesive tape No. 571" is preferably used as the adhesive tape 20. Although this tape has elasticity in itself, any known adhesive tape having no elasticity can be also used. It is noted that adhesive material, in place of the double-sided adhesive tape, may be coated on the upper surface of the flange 14*a*. An opening 14*c* to be used for detecting the completion of winding of the cassette cover 18 is formed substantially in the middle of one of longitudinal portions of the flange 14*a*. A bar code 37 is bonded on a rear wall of the cassette box 14 to recognize the kind and size of films 7 accommodated in the cassette box 14. When a plurality, for example 100 sheets, of films 7 are charged in the cassette box 14, a plastic cardboard 6 is initially inserted in the cassette box 14. The films 7 are then placed on the cardboard 6 and the cassette cover 18 is bonded on the upper surface of the flange 14*a* to prevent light from entering the cassette box 14.

Figure 4:
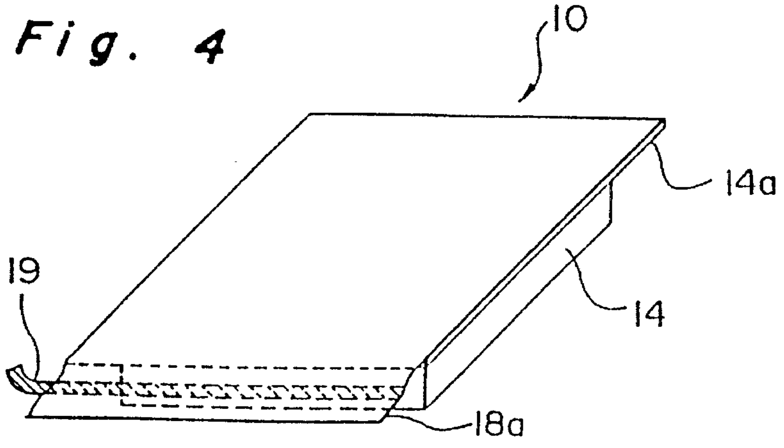
FIG. 4 is a perspective view of the whole film cassette.

FIG. 4 depicts the disposable cassette 10 after assembling.

As shown in FIG. 4, the cassette cover 18 is provided with a leading portion 18*a* extending approximately 30–40 mm from the front edge of the flange 14*a* of the cassette box 14. A double-sided adhesive tape 19 with a separation sheet or other similar material is bonded or coated on the leading end portion 18*a* of the cassette cover 18 in parallel to the front edge of the cassette box 14.

Explanation will be made hereinafter with respect to a printer provided with the cassette 10 having the above described construction.

Figure 5:
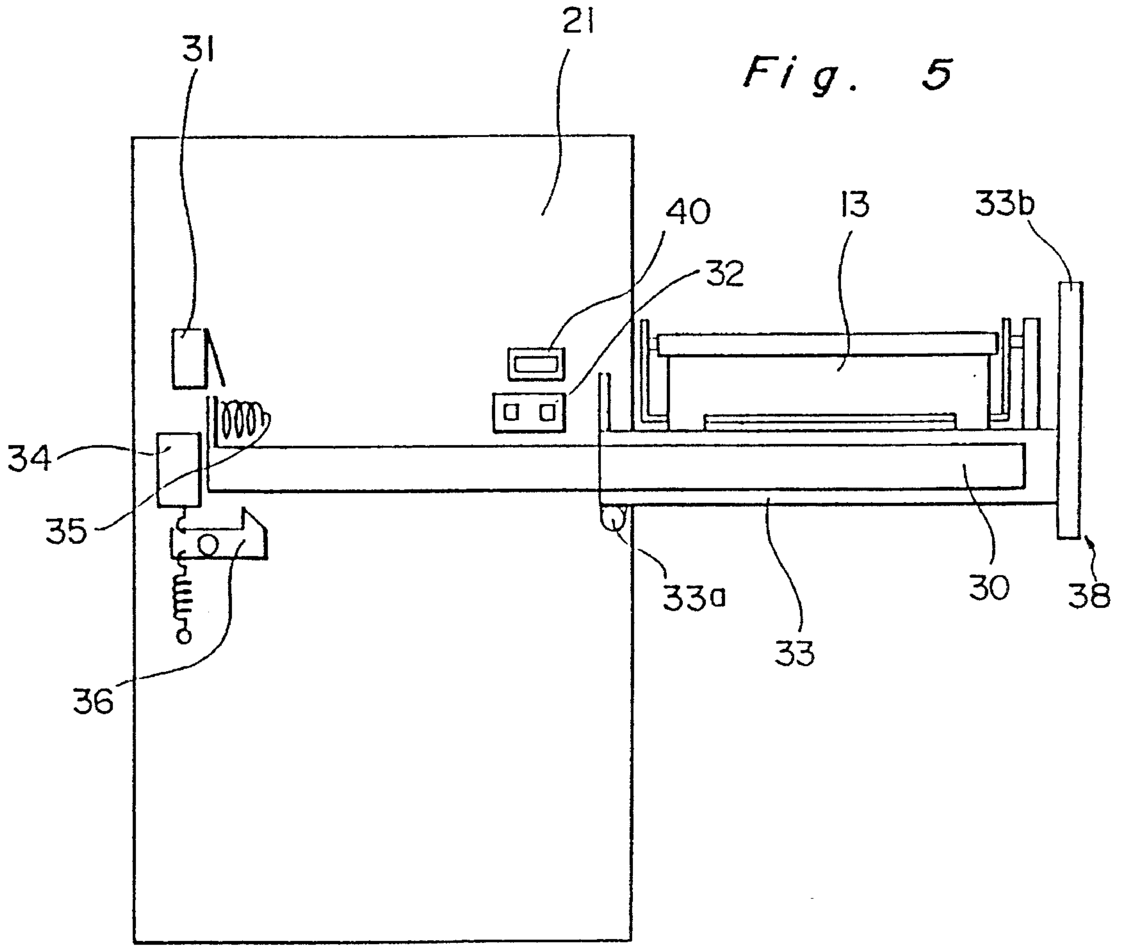
FIG. 5 is a side view of a drawer in which the film cassette is accommodated.

As shown in FIG. 5, a printer 21 is provided with a drawer 38, in which the cassette 10 is charged. The drawer 38 is comprised of a drawer base 33, a cassette case 13 for accommodating the cassette 10 and a pair of drawer rails 30 fixedly mounted at a central portion of the printer 21. The cassette case 13 is securely mounted on the drawer base 33, which is in engagement with the drawer rails 30. Accordingly, the cassette 10 can be charged in or removed from the cassette case 13 by drawing the cassette case 13 outwards. A solenoid-operated lock arm 36 for locking the drawer 38, a solenoid 34 for operating the lock arm 36 and a microswitch 31 for detecting that the drawer 38 has been closed are disposed in the interior of the drawer 38. The lock arm 36 has one hooked end which can be in mesh with a stopper 33*a* rigidly secured to the bottom of the drawer base 33. A photosensor 32 for reading the bar code 37 bonded on the rear wall of the cassette box 14 and a microswitch 40 for timely causing the photosensor 32 to emit light are disposed above one drawer rail 30 located on the right side when facing the printer 21.

Upon depression of a button (not shown) for opening the drawer 38, if the inside of the cassette box 14 is not shielded, the cassette box 14 is initially shielded by the cassette cover 18. Thereafter, the solenoid 34 is temporarily turned on to release the engagement between the lock arm 36 and the stopper 33*a* mounted on the bottom of the drawer base 33. In this event, the drawer 38 is moved rightward, as viewed in FIG. 5, by the action of a drawer opening spring 35 having one end secured to the interior of the drawer 38. Under such conditions, when a front panel 33*b* of the drawer integrally formed with the drawer base 33 is manually pulled, the drawer 38 is fully opened so that the cassette case 13 is readily accessible, as shown in FIG. 6 in which the front panel 33*b* is omitted for brevity's sake.

A take-up unit for winding or rewinding the cassette cover 18 is disposed around the cassette case 13 mounted on the drawer base 33. The take-up unit is comprised of a take-up roller 22 extending over the cassette case 13, a pair of slidable roller supports 25 for rotatably supporting the take-up roller 22, an electric motor 29 securely mounted on one of the roller supports 25 and a gear assembly 28 through which the take-up roller 22 is driven by the motor 29. The gear assembly 28 includes a pinion 28*a* rotatably supported by one of the roller supports 25 and a rack 27 disposed along the front edge of the cassette case 13. The pinion 28*a* and the rack 27 are in mesh with each other so that the take-up roller 22 along with the roller supports 25 may move in parallel while rotating. To this end, two slide rails 26 for slidably supporting the roller supports 25 are interposed between the cassette case 13 and the roller supports 25.

The cassette case 13 has at its front bottom portion a plurality of circular openings 13*a* through which lifting rods of a lifting device extend, at its rear wall a rectangular opening 13*b* through which the bar code 37 of the cassette 10 is detected and at its flange portion a circular opening 13*c* through which a reflection type photosensor 23 detects an end position of the roller supports 25. The lifting device will be later discussed. Around the cassette case 13 are disposed the photosensor 23 and a microswitch 24 for detecting an initial position of the roller supports 25 where the cassette box 14 is completely shielded by the cassette cover 18.

Figure 6:
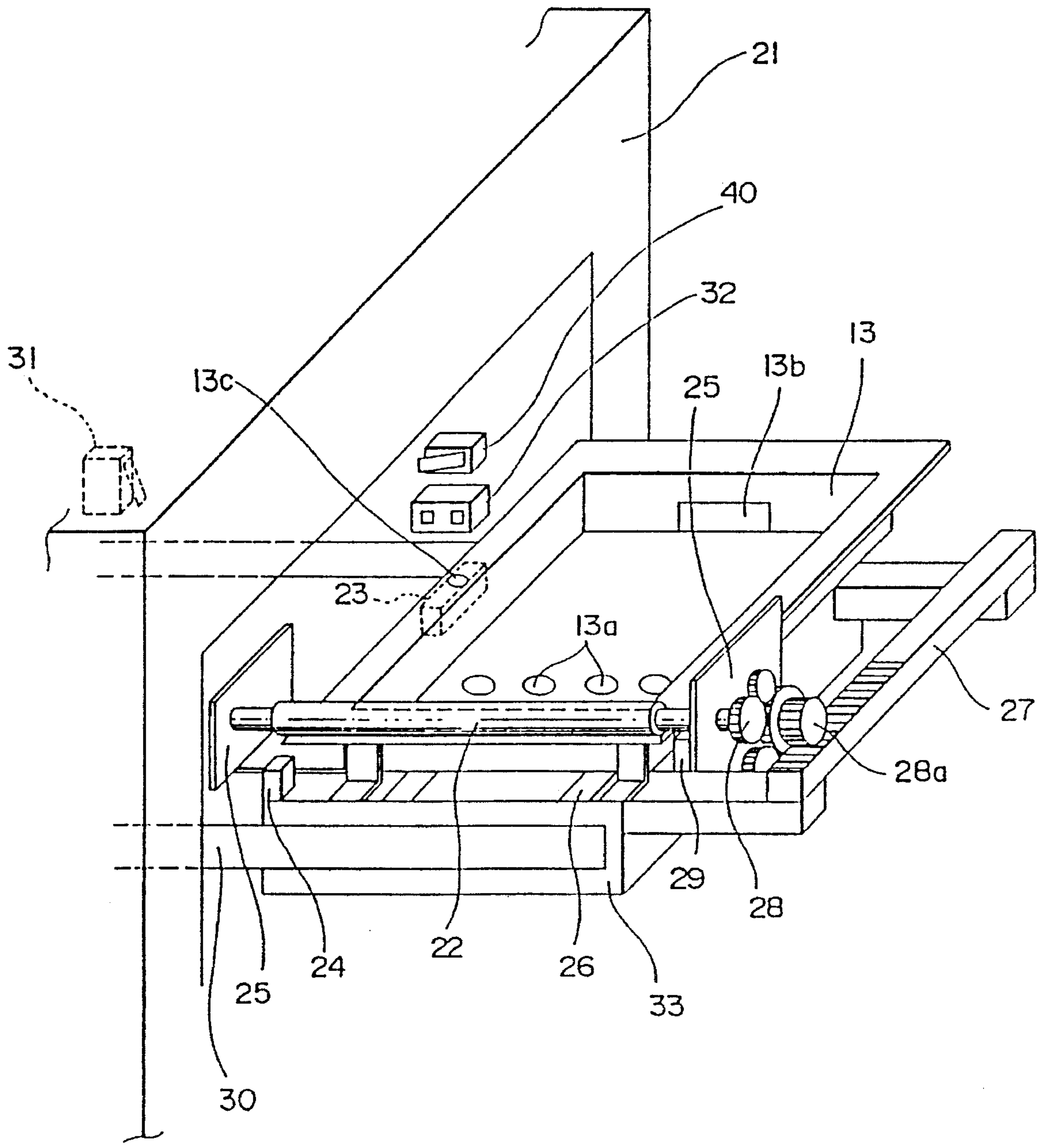
FIG. 6 is a perspective view of the drawer when the drawer is opened.

FIG. 6 depicts initial conditions of the drawer 38 under which the cassette 10 is properly set in the cassette case 13. After the separation sheet of the adhesive tape 19 bonded on the leading end portion 18*a* of the cassette cover 18 has been peeled off, the leading end portion 18*a* is bonded on and wound around the take-up roller 22. In this way, the charge of the cassette 10 is completed.

When the drawer 38 is closed and accommodated in the printer 21 by pushing the front panel 33*b*, the sensor 32 reads the bar code 37 bonded on the rear face of the cassette 10 to detect the kind and size of films set in the cassette 10 and the drawer 38 turns the microswitch 31 on.

Figure 7:
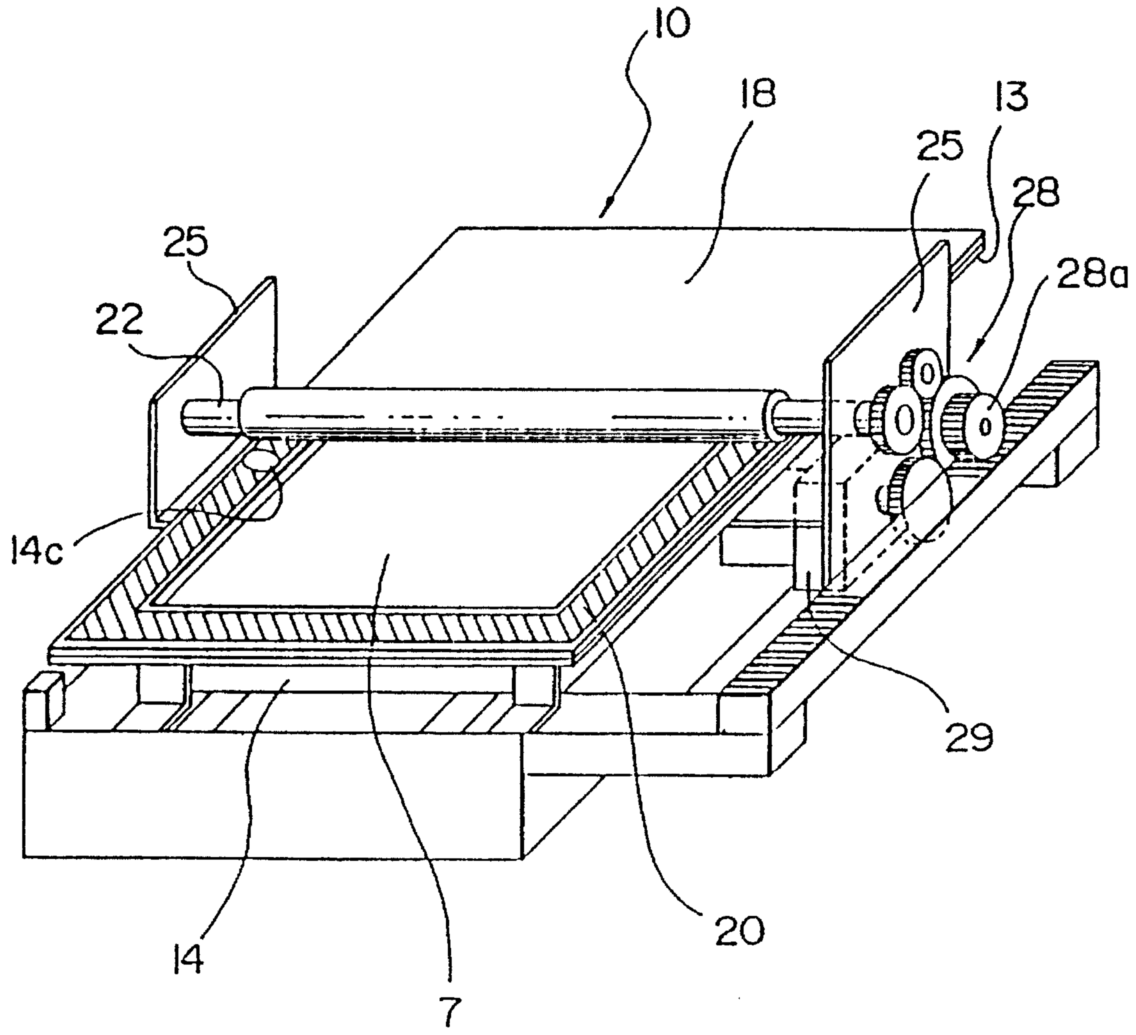
FIG. 7 is a perspective view of the film cassette accommodated in the drawer, which particularly shows the state in which a cassette cover is opened.

When the microswitch 31 is turned on, the motor 29 is also turned on to drive the gear assembly 28 so that the take-up roller 22 may rotate and the roller supports 25 may move rearwards in parallel. As a result, the cassette cover 18 is wound around the take-up roller 22 and the cassette 10 is opened, as shown in FIG. 7. When the cassette cover 18 is wound in the amount enough for feeding films, for example approximately half of its length, both the openings 13*c* and 14*c* are opened and the reflection type photosensor 23 is turned off to stop the motor 29. More specifically, when light transmission is intercepted by the cassette cover 18 which closes the openings 13*c* and 14*c*, the photosensor 23 is turned on. In contrast, when these openings 13*c* and 14*c* are opened to permit the light transmission, the photosensor 23 is turned off.

The relationship between the traveling speed of the take-up roller 22 for winding the cassette cover 18 and the peripheral speed of the take-up roller 22 is determined so that the former may be approximately 1.15 times greater than the latter. The reason for this is that when the cassette 10 is removed from the cassette case 13, the cassette 10 must be completely shielded from light. To achieve this end, the take-up roller 22 is required to move so as to apply tension to the cassette cover 18 in order that the cassette cover 18 would be closely bonded on the cassette box 14. At the beginning of winding, the cassette cover 18 is loose to some extent. However, the roll diameter of the take-up roller 22 becomes larger and the peripheral speed thereof becomes faster, as the cassette cover 18 is wound around the take-up roller 22. Accordingly, looseness of the cassette cover 18 disappears. Furthermore, since it is so designed that the adhesive tape 20 is always bonded on the flange 14*a* of the cassette box 14 even when the cassette cover 18 is separated from the adhesive tape 20, the winding and rewinding of the cassette cover 18 is always smoothly performed.

Figure 8:
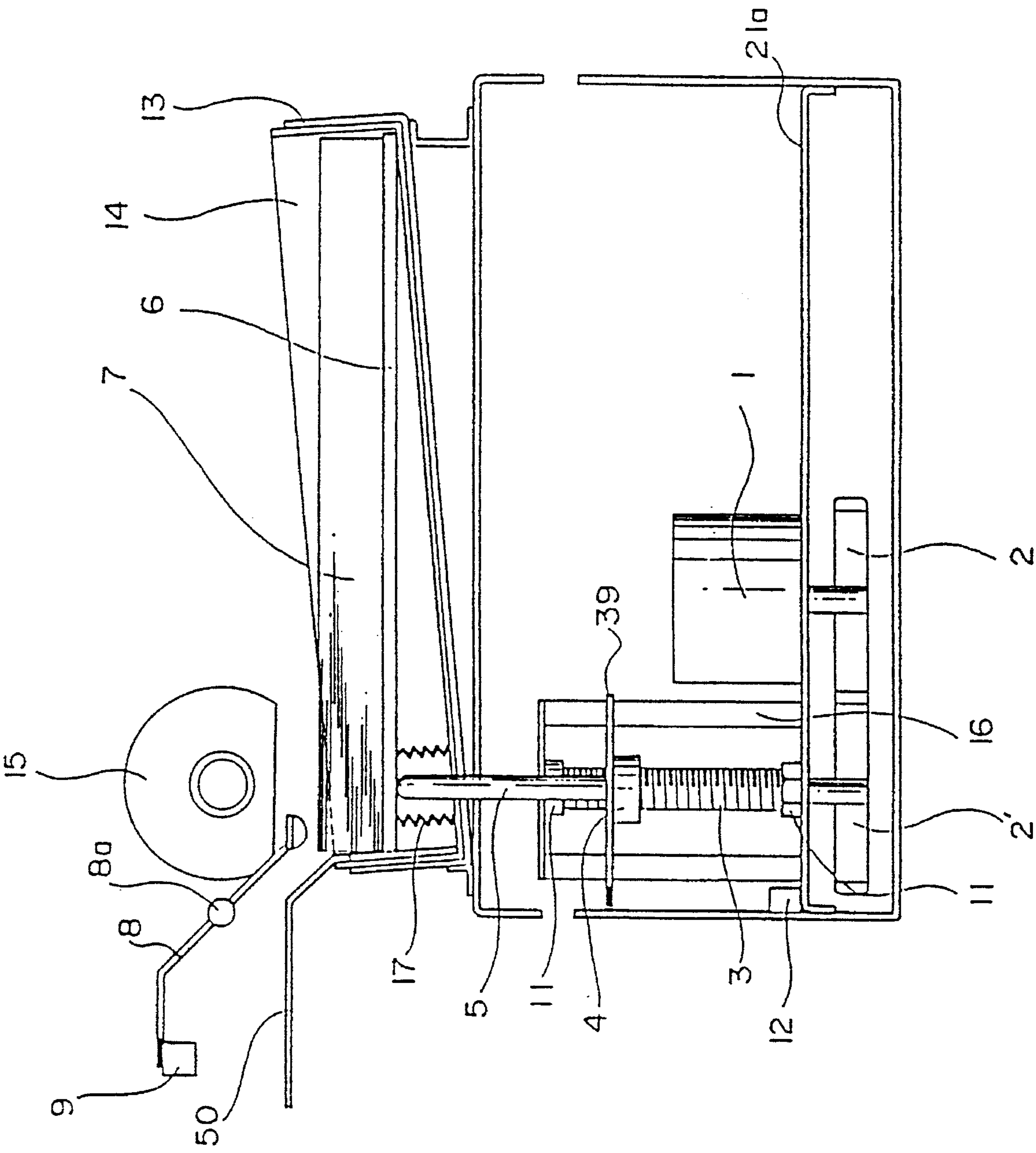
FIG. 8 is a side sectional view of a film lifting mechanism provided in the printer of FIG. 1.

FIG. 8 depicts a film lifting mechanism disposed below the drawer 38. The lifting mechanism keeps the height of films 7 accommodated in the cassette box 14 always constant so that the topmost sheet of films 7 may be fed towards the sub-scanning portion D by a feed roller assembly 15.

The lifting mechanism is provided with a plurality of, for example four, lifting rods 5 for moving up and down the front end of the cardboard 6, on which the films 7 are placed. The lifting rods 5 are fixedly mounted on a mounting plate 39, to a central portion of which a nut 4 is rigidly secured from below. A vertical threaded shaft 3 extends through a base plate 21*a* fixed to the printer 21 and is rotatably supported by a bearing 11 fixed to the base plate 21*a*. A gear 2' is secured to the lower end of the threaded shaft 3 and in mesh with a gear 2 secured to an output shaft of an electric motor 1 for lifting use. When the motor 1 drives the threaded shaft 3 via the paired gears 2 and 2', the lifting rod mounting plate 39 moves up and down together with the lifting rods 5 along its guide members 16 because the nut 4 is in mesh with the threader shaft 3. The lifting mechanism further includes a photosensor 12 mounted on the base plate 21*a* for detecting the lower limit of the lifting rods 5 and a film height detector 8 disposed above a film guide plate 50 for detecting the height of a stack of films 7 placed on the cardboard 6. The film guide plate 50 is provided for guiding the films 7 to be fed and will be further discussed later. The film height detector 8 can pivot about its fulcrum 8*a* and has one semispherical end which is brought into contact with the upper surface of the film stack 7 and the other bent end which confronts a photosensor 9 to be used for detection of the height of the film stack 7. When the lifting rods 5 are located at their lowest position, the lifting rod mounting plate 39 turns the photosensor 12 on. Upon rotation of the motor 1, the lifting rods 5 push the cardboard 6 upwards to lift the leading ends of the films 7. When the topmost film is brought into contact with the semispherical end of the film height detector 8, the other end thereof turns the photosensor 9 on. In this event, the motor 1 is reversed and then stopped upon rotation thereof by a predetermined number of pulses.

Although the film height detector 8 is biased clockwise, as viewed in FIG. 8, about its fulcrum 8*a* by its own weight, the detector 8 can not further pivot clockwise from the position as indicated in FIG. 8. Upon reverse rotation, when the motor 1 is stopped, the semispherical end of the film height detector 8 and truncated portions of the rollers 15*a* and 15*b* are out of contact with the upper surface of the film stack 7.

When the topmost film is printed and discharged, the motor 1 rotates to feed the next film now located topmost in the cassette box 14. Thereafter, the film stack 7 is lifted by one film so that the distance between the feed roller assembly 15 and the upper surface of the topmost film may be kept constant.

Figure 9A:
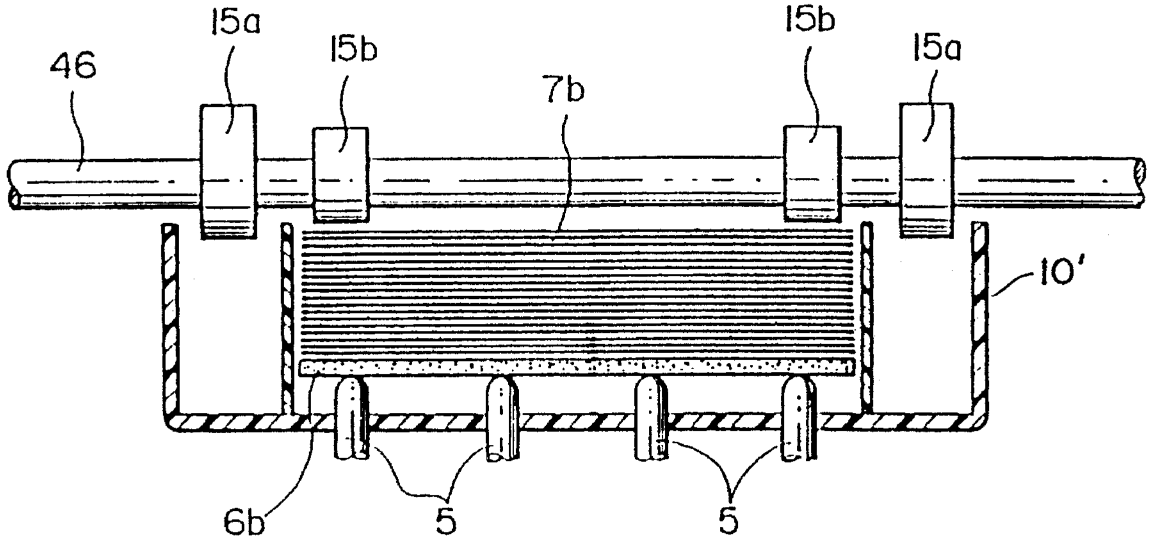
FIGS. 9*a* and 9*b* are sectional views of two different film cassettes accommodating small-sized films and large-sized films, respectively, which particularly show the relationship between these film cassettes and a feed roller assembly.
Figure 9B:
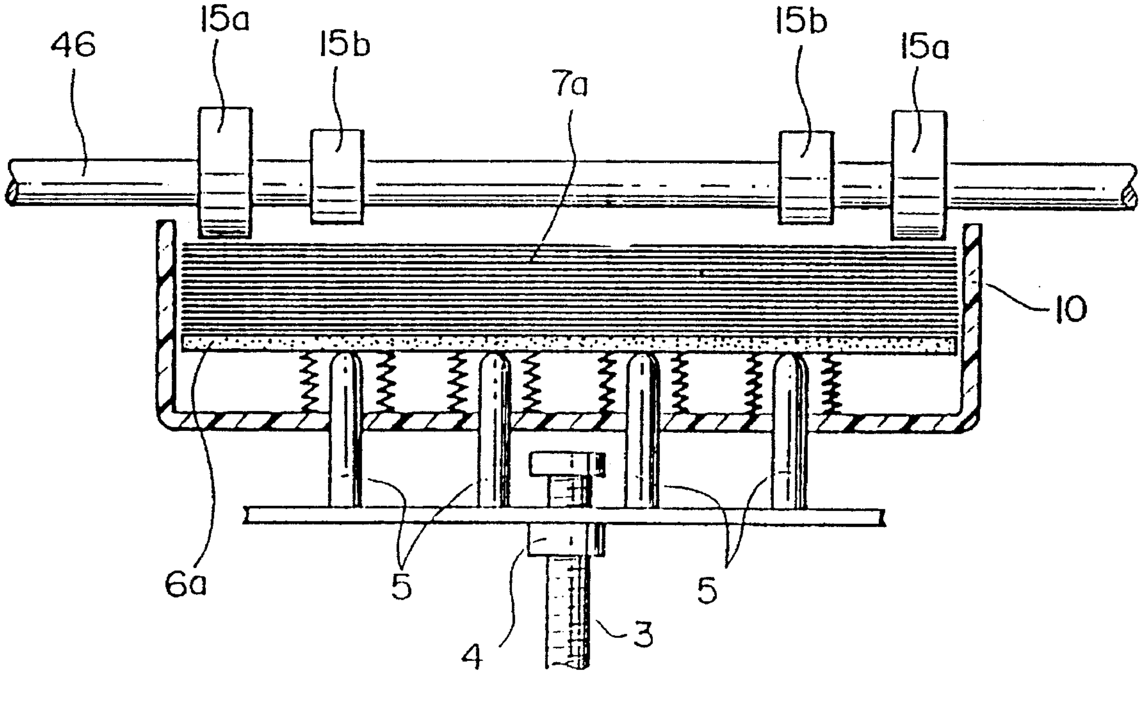

As shown in FIGS. 9*a* and 9*b*, the feed roller assembly 15 includes two rollers 15*a* for feeding large-sized films 7*a* and two rollers 15*b* for feeding small-sized films 7*b*, all of which rollers are semicircular in the form of a figure "D" and fixedly mounted on a roller shaft 46. When the films 7*a* or 7*b* are fed, the rollers 15*a* or 15*b* are brought into contact with the upper surface of both sides of the topmost film so that the topmost film may be fed without fail. The reason for this is that emulsion is coated on the upper surface of each film, unlike paper sheets to be used in an ordinary copying apparatus. The topmost film is brought into contact with the rollers 15*a* or 15*b* only when the film is fed, and the central portion thereof to be used for the printing is hardly damaged.

As shown in FIG. 9*a*, in the case of a film cassette 10' accommodating small-sized films 7*b*, the motor 1 is reversed by a reduced amount and the height of the topmost film in the cassette 10' is kept constant at a higher level. On the other hand, as shown in FIG. 9*b*, in the case of a film cassette 10 accommodating large-sized films 7*a*, the height of the topmost film is kept constant at a lower level.

Figure 10:
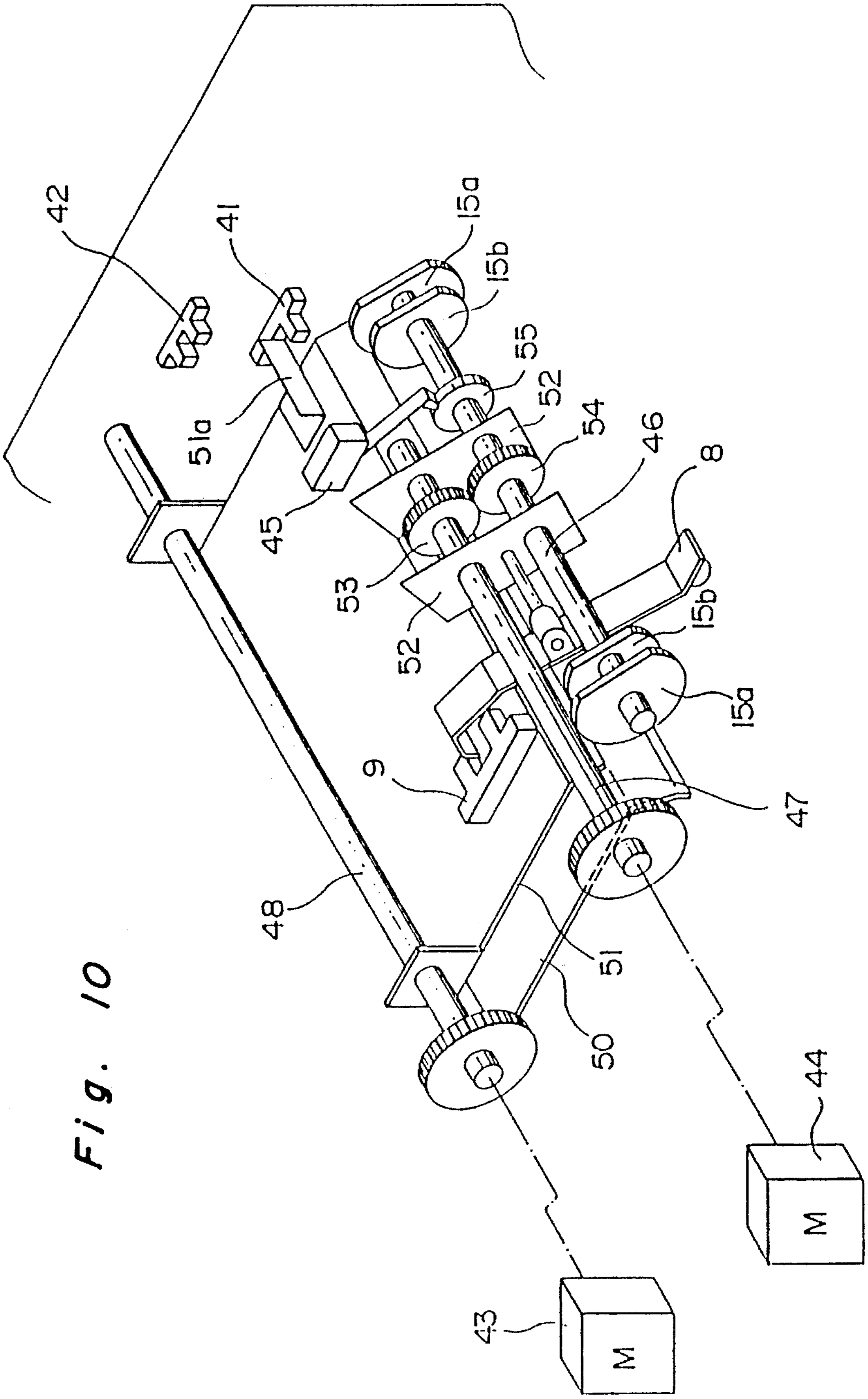
FIG. 10 is a perspective view of a film feed mechanism provided in the printer of FIG. 1.
Figure 11:
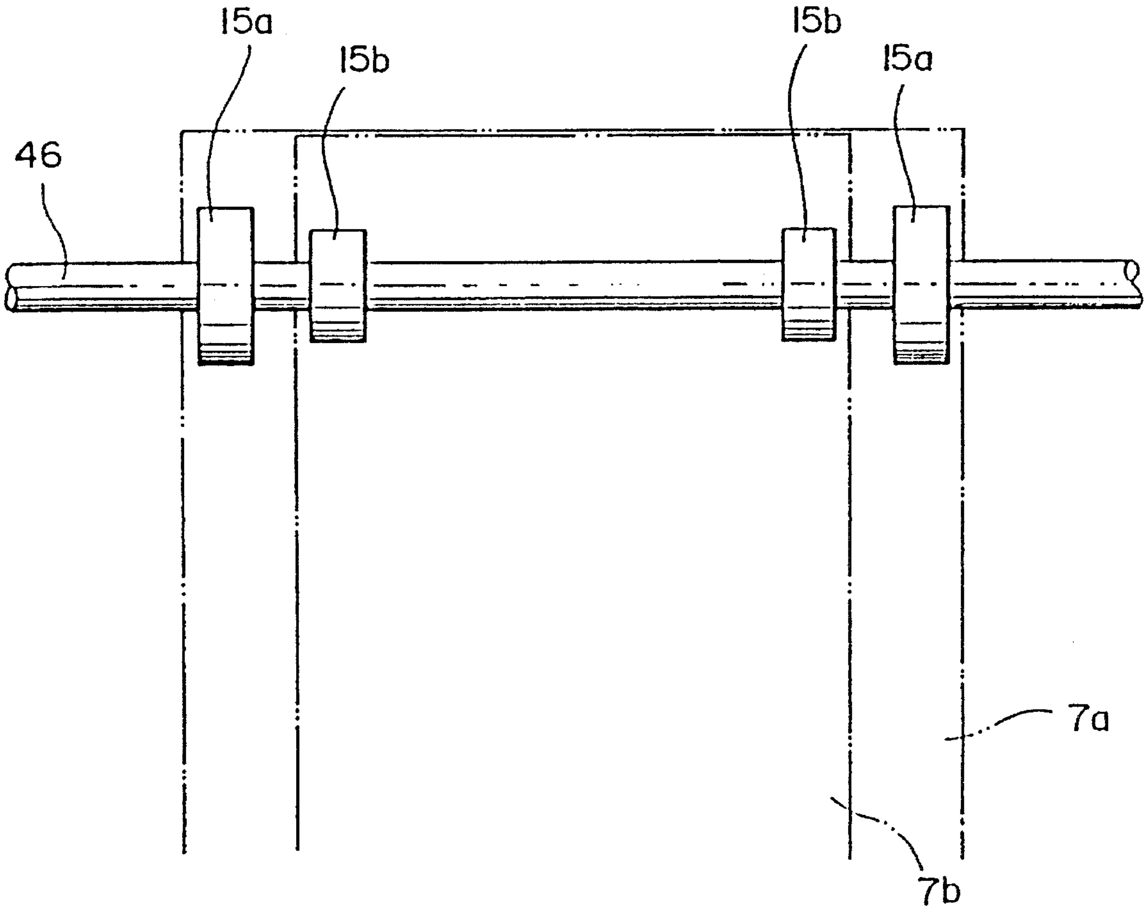
FIG. 11 is a diagram indicative of the relationship between the feed roller assembly and films accommodated in the film cassette.

FIG. 10 depicts a mechanism for feeding films 7*a* or 7*b* accommodated in the cassette 10 or 10'. This film feed mechanism is provided with a feed roller assembly 15 including rollers 15*a* and 15*b* fixedly mounted on both ends of a roller shaft 46, a film guide plate 50, a tilt plate 51 disposed above and in parallel with the film guide plate 50, a roller shaft driving shaft 47 disposed in parallel with the roller shaft 46 for driving the roller shaft 46, an electric motor 44 for driving the roller shaft driving shaft 47, a guide plate driving shaft 48 connected to the tilt plate 51 for tilting the tilt plate 51 along with the film guide plate 50 and an electric motor 43 for driving the guide plate driving shaft 48. The roller shaft 46 and the roller shaft driving shaft 47 are rotatably supported by a pair of spaced support plates 52 secured to a central portion of a bent end of the tilt plate 51. The motor 44 rotates the roller shaft 46 via the roller shaft driving shaft 47 because a gear 53 fixed to the roller shaft driving shaft 47 is in mesh with a gear 54 fixed to the roller shaft 46. A microswitch 45 is mounted on the tilt plate 51 and detects the position of the roller shaft 46 in association with a rotary plate 55 fixed to the roller shaft 46. To this end, the microswitch 45 is provided with a lever engageable with a notch (not shown) formed on the periphery of the rotary plate 55. Two sensors 41 and 42 are provided in this mechanism in association with a plate 51*a* secured to the upper surface of the tilt plate 51 to detect the lowest position and the highest position of the tilt plate 51, respectively.

Figure 12A:
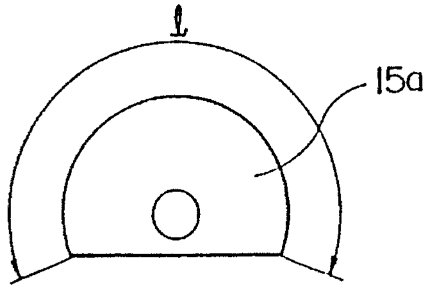
FIGS. 12*a* and 12*b* are side views of two different rollers of the feed roller assembly.
Figure 12B:
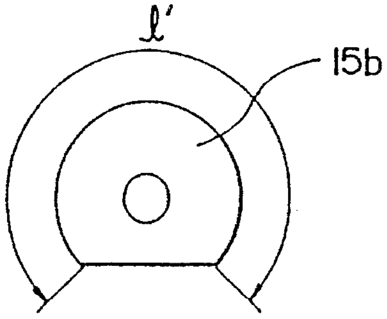

As shown in FIGS. 12*a* and 12*b*, all the rollers 15*a* and 15*b* are generally in the form of a figure "D" and have respective truncated portions. The feed roller assembly 15 acts so that the rollers 15*a* and 15*b* normally stop when their truncated portions confront the film stack 7, as shown in FIG. 8. It is noted that a length l of an arc of the rollers 15*a* is the same as a length l' of an arc of the rollers 15*b*. This length l or l' is a length required for feeding each film up to the transport rollers 56 located downstream of the feed roller assembly 15. In other words, after the film has been fed by the feed roller assembly 15, the film is subsequently fed by the transport rollers 56 towards the sub-scanning portion D.

The rotation of the rollers 15*a* and 15*b* of the feed roller assembly 15 is controlled by the microswitch 45 so that the topmost film in the film stack 7 may be fed through one rotation of the rollers 15*a* or 15*b*. Furthermore, the motor 43 tilts the whole film feed mechanism via the shaft 48 so that the film guide plate 50 may not prevent the drawer 38 from being opened or closed.

FIGS. 13*a* to 13*d* depict the relationship between the cassette 10 and the film guide plate 50. A plurality of ribs 14*b* are formed on a front portion of the cassette box 14, as shown in FIG. 13*a*, while two spaced tabs 50*b* are integrally formed with the front end of the film guide plate 50, as shown in FIG. 13*d*. When the tilt plate 51 is at its lowest position, the tabs 50*b* of the film guide plate 50 are located between the ribs 14*b* of the cassette box 14. When the films 7 are fed under such conditions as shown in FIG. 13*c*, the leading ends thereof are not in contact with the film guide plate 50. After the feed of the films 7, the motor 43 is turned on to move the film feed mechanism upwards and to place it at its standby position.

Figure 14:
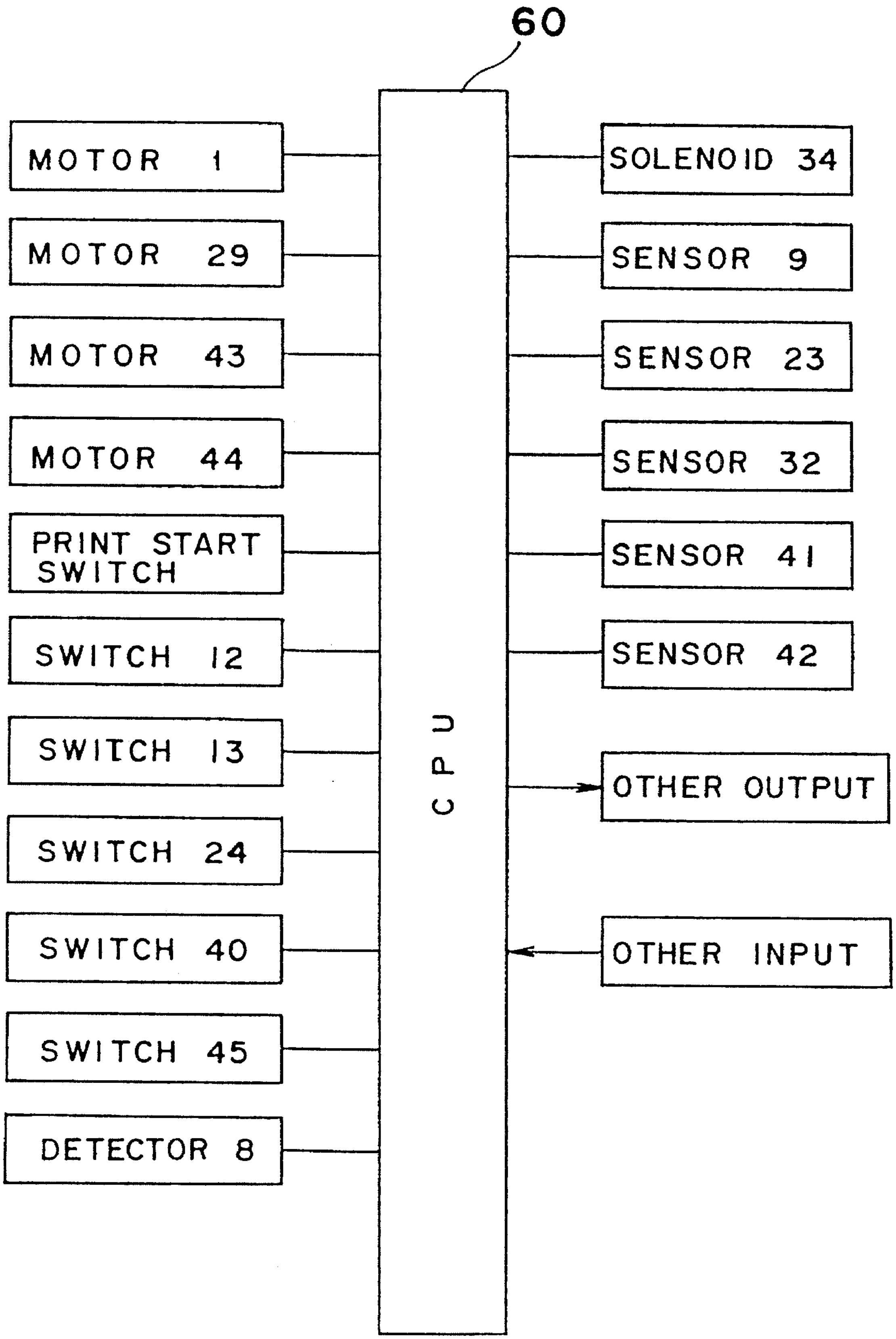
FIG. 14 is a block diagram of a control system of the printer of FIG. 1.

FIG. 14 depicts a block diagram for controlling various switches, sensors, motors and the like as described above.

As shown in FIG. 14, a control system of the printer is provided with a CPU 60 which is electrically coupled with the motors 1, 29, 43 and 44, the film height detector 8, a print start switch or other switches 12, 13, 24, 40 and 45, the sensors 9, 23, 32, 41 and 42, and the solenoid 34. Furthermore, the CPU 60 receives signals sent from other elements provided in the printer and outputs signals to be sent to such elements.

The operation of the film feed arrangement having the above described construction will be discussed hereinafter with reference to flow-charts of FIGS. 15 to 21.

Figure 15:
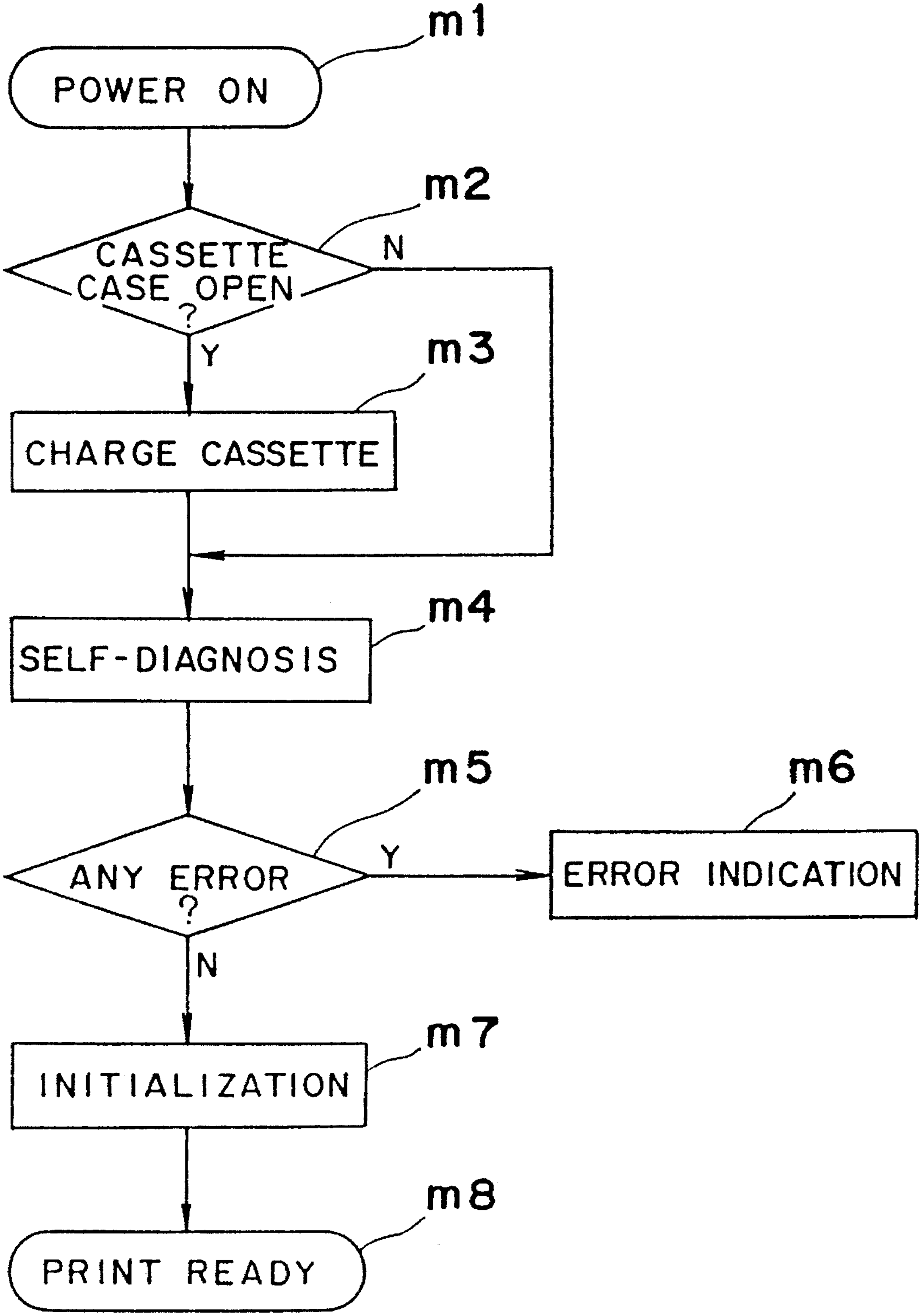
FIGS. 15, 16, 17*a*, 17*b*, 18*a*, 18*b*, and 19–21 are flowcharts indicative of the operation of the printer of FIG. 1.

In a main flow-chart of FIG. 15, upon depression of a power button of the printer, the CPU 60 is powered on at step m1. The microswitch 31 detects at step m2 whether or not the cassette case 13 is open. In the case where the cassette case 13 is open, an indication for urging an operator to charge a cassette into the cassette case 13 is displayed at step m3. When the cassette has been properly charged, the printer makes a self-diagnosis of system status at step m4 followed by step m5 at which it is judged whether or not any error has happened. If the judgment at step m5 is YES, an error indication is provided at step m6. In contrast, if no error has discovered, the system status is initialized at step m7 followed by step m8 at which the printer becomes ready.

The above description has been made with respect to the printer in which when the microswitch 31 detects that the drawer 38 has been closed, the cassette cover 18 is automatically wound by the take-up roller 22. However, the present invention can be applied to any other printer in which after the drawer has been closed, the automatic winding of the cassette cover 18 is performed upon depression of a manual switch or upon input of a start signal sent from a host computer which supplies image signals to the printer. The manual switch may be a print start switch for starting the printing operation.

Figure 16:
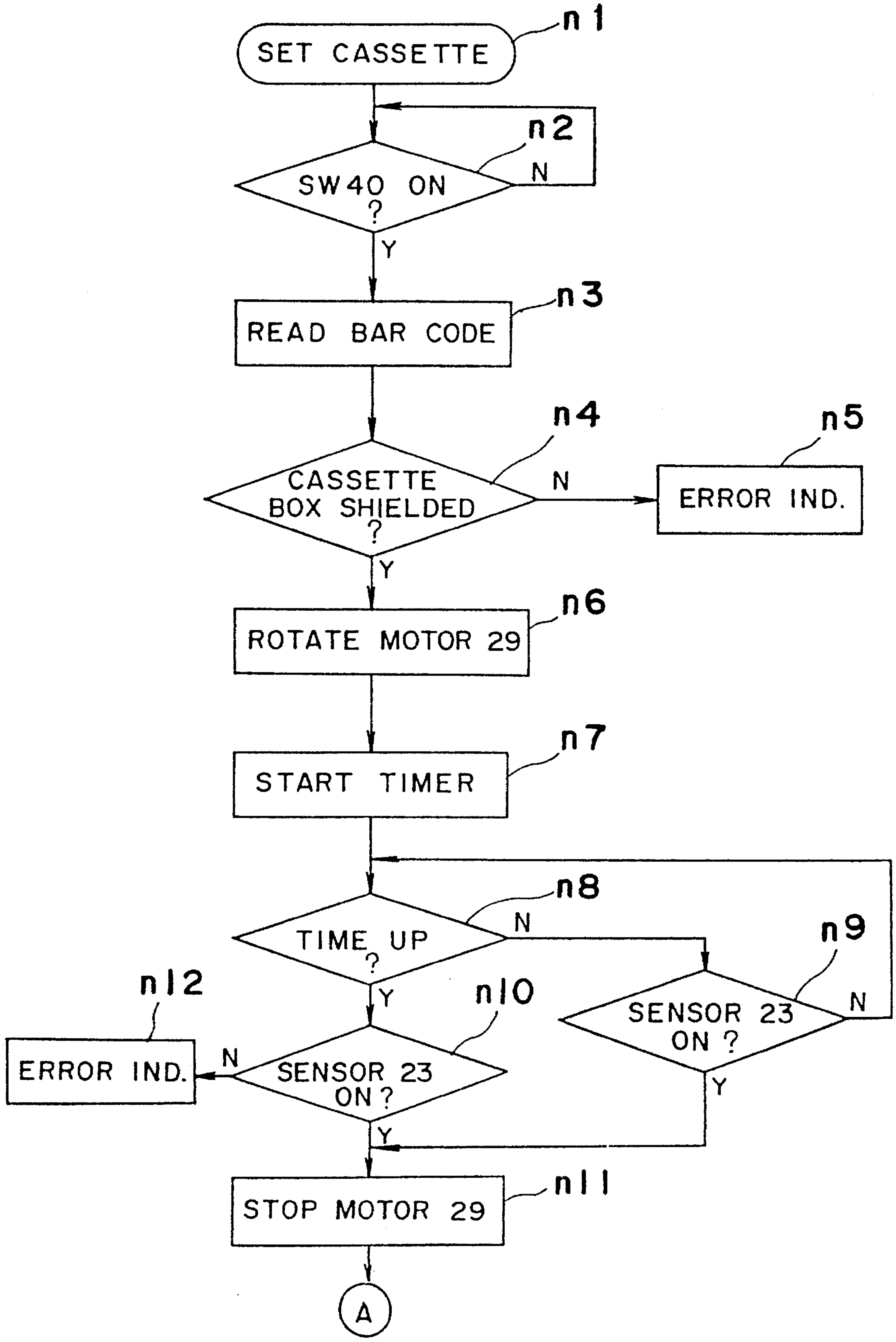

The charge of the cassette 10 and the winding of the cassette cover 18 will be explained with reference to FIGS. 5 to 7 and the flow-chart of FIG. 16.

It is initially Judged at step n1 whether or not the opening and closing of the drawer 38 has been conducted. This fact is judged by the microswitch 40 which timely causes the photosensor 32 to emit light. The opening and closing of the drawer 38 turns the microswitch 40 on at step n2 and causes the photosensor 32 to read the bar code 37 bonded on the rear wall of the cassette box 14 for recognition of the kind and size of films charged into the cassette 10 (step n3). The kind and size of films are then sent to the CPU 60.

The microswitch 24 judges at step n4 whether or not the roller supports 25 are at the initial position thereof where the cassette box 14 is completely shielded by the cassette cover 18. If the roller supports 25 are not at the initial position, an error indication is provided at step n5. If the roller supports 25 are at the initial position, the motor 29 is rotated to wind the cassette cover 18 at step n6 and a timer is started at step n7. The timer is set to a value slightly greater than the value required for winding an ordinary cassette cover 18. The winding operation is continued until the Cassette cover 18 opens the opening 14*c* formed in the flange 14*a* of the cassette box 14. When the photosensor 23 has detected the completion of winding of the cassette cover 18 (step n9) before the timer is up (step n8), the motor 29 for winding use is stopped (step n11) because it is considered that the cassette cover 18 has been properly wound around the take-up roller 22. FIG. 7 depicts such conditions. In contrast, if the photosensor 23 cannot detect the completion of winding of the cassette cover 18 (step n10) when the timer is up (step n8), an error indication is provided at step n12. Such error is caused by motor malfunction, improper winding or the like. The improper winding is occasionally caused by the fact that an operator has forgotten to fasten the leading end portion 18*a* of the cassette cover 18 to the take-up roller 22.

Figure 17A:
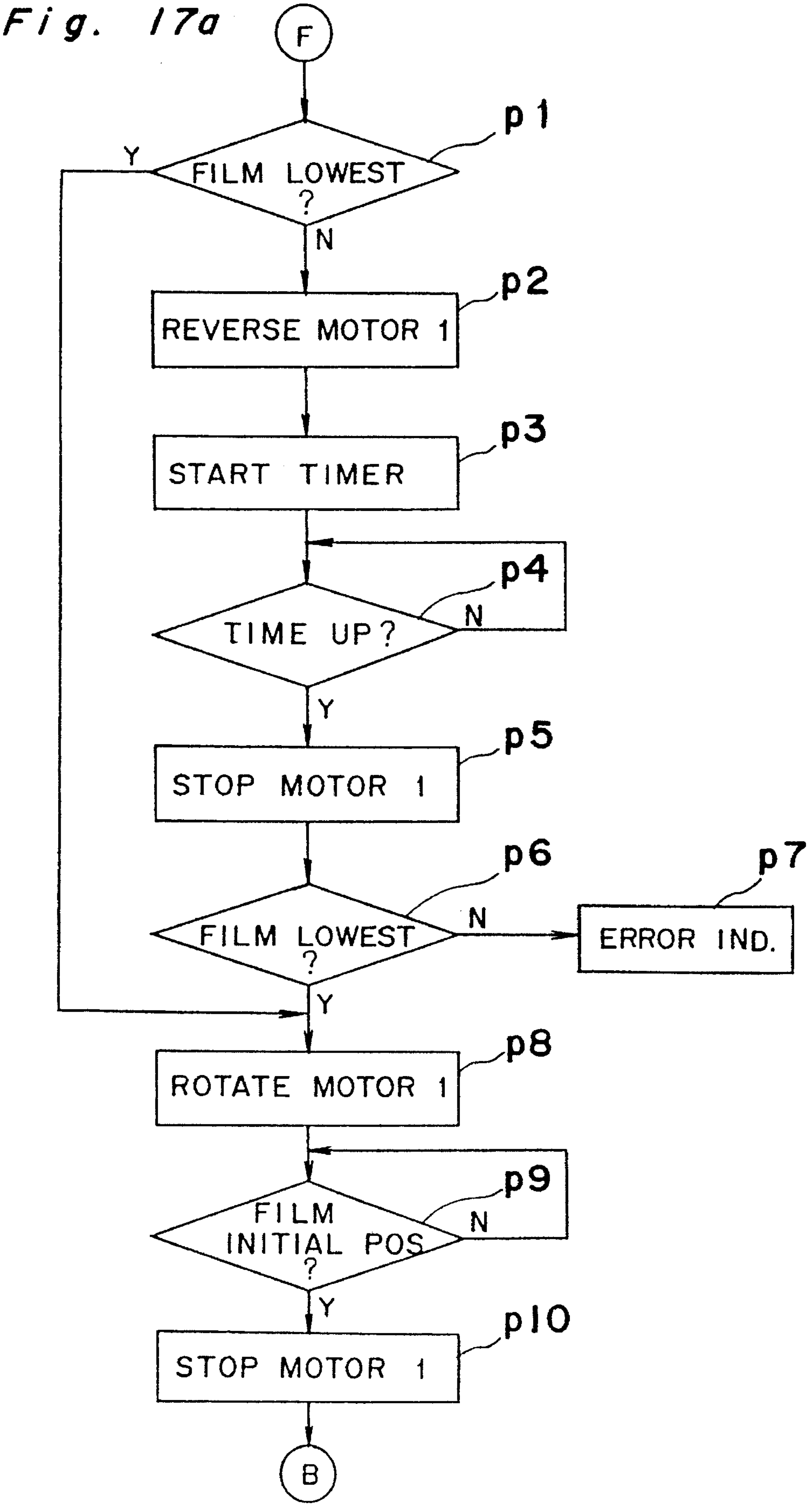

The operation of the film lifting device will be discussed hereinafter with reference to FIG. 8 and flowcharts shown in FIGS. 17*a* and 17*b*.

The photosensor 12 initially judges at step p1 whether or not the mounting plate 39 of the lifting rods 5 is at its lowest position. If the mounting plate 39 is not located at this position, the motor 1 is reversed at step p2 and a timer is started at step p3. When the timer is up at step p4, the motor 1 is stopped at step p5. If the motor 1 is out of order, an error indication is provided at step p7.

Thereafter, the lifting rods 5 are moved upwards by rotating the motor 1 at step p8 so that the topmost one of the films 7 charged in the cassette box 14 may be located at its initial position where the topmost film can contact with the feed rollers 15*a* or 15*b*. When the topmost film is brought into contact with the film height detector 8 for detecting the height of the film stack 7 at step p9, the photosensor 9 to be used for detection of the height of the film stack 7 is activated to stop the motor 1 at step p10.

Figure 17B:
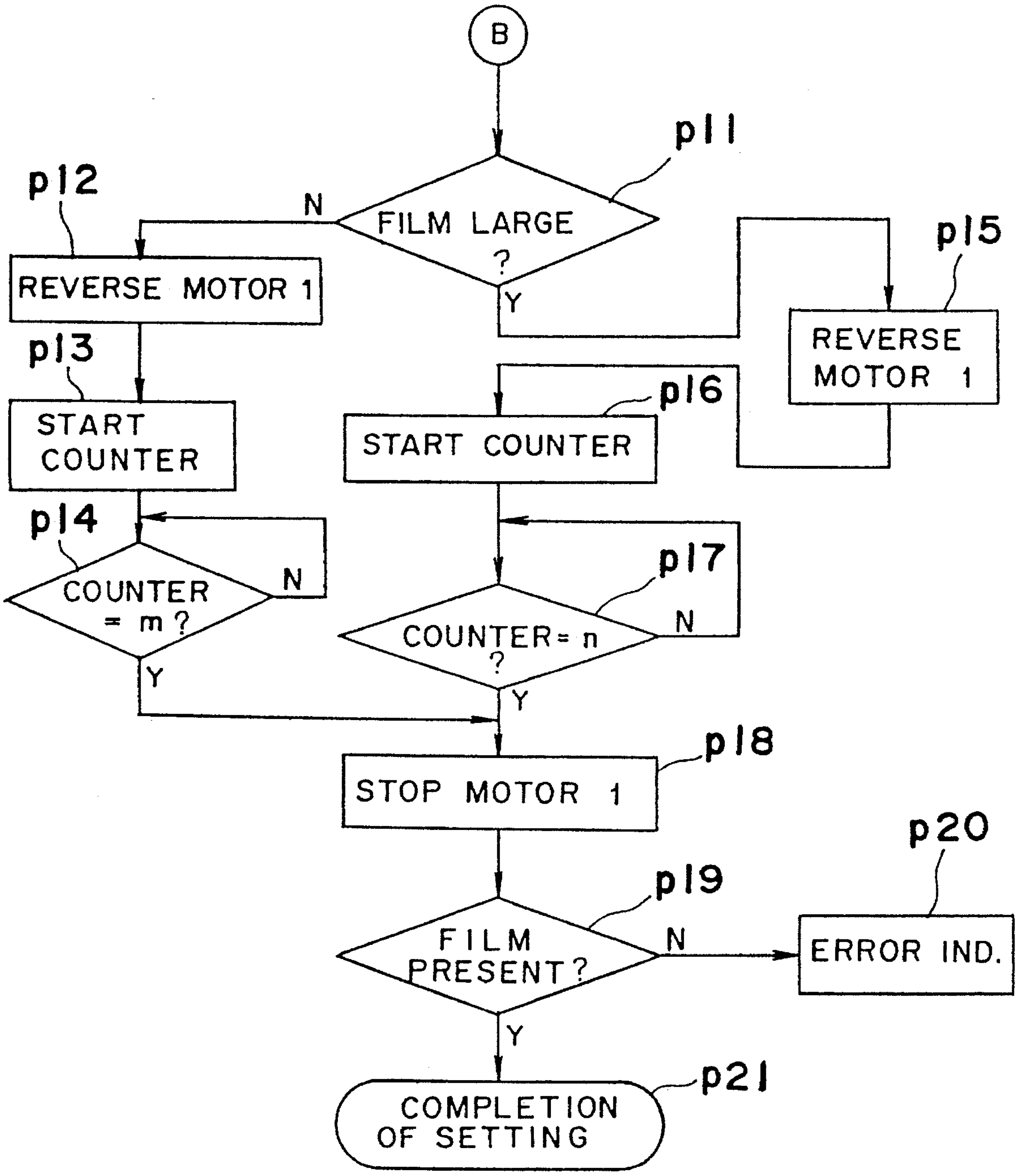

In the flow-chart of FIG. 17*b*, the photosensor 32 reads the kind, size etc. of films stored in advance in the bar code 37 to judge the size of film cassette at step p11. The motor 1 is then reversed at step p12 or p15 and a pulse counter is started at step p13 or p16. When the counter reaches a predetermined number m or n (m<n) set in advance in accordance with the size of film cassette at step p14 or p17, the motor 1 is stopped at step p18. FIGS. 9*a* and 9*b* depict such conditions in which the topmost film is out of contact with both the film height detector 8 and the feed rollers 15*a* and 15*b* and faces the flat portions of the rollers 15*a* and 15*b*. Thereafter, the photosensor 9 detects the presence or absence of the films 7 in the cassette box 14 at step p19. If no film is contained in the cassette box 14, an error indication is provided at step p20. In contrast, if a film or films 7 remain in the cassette box 14, the setting of the cassette 10 is completed at step p21.

Figure 18A:
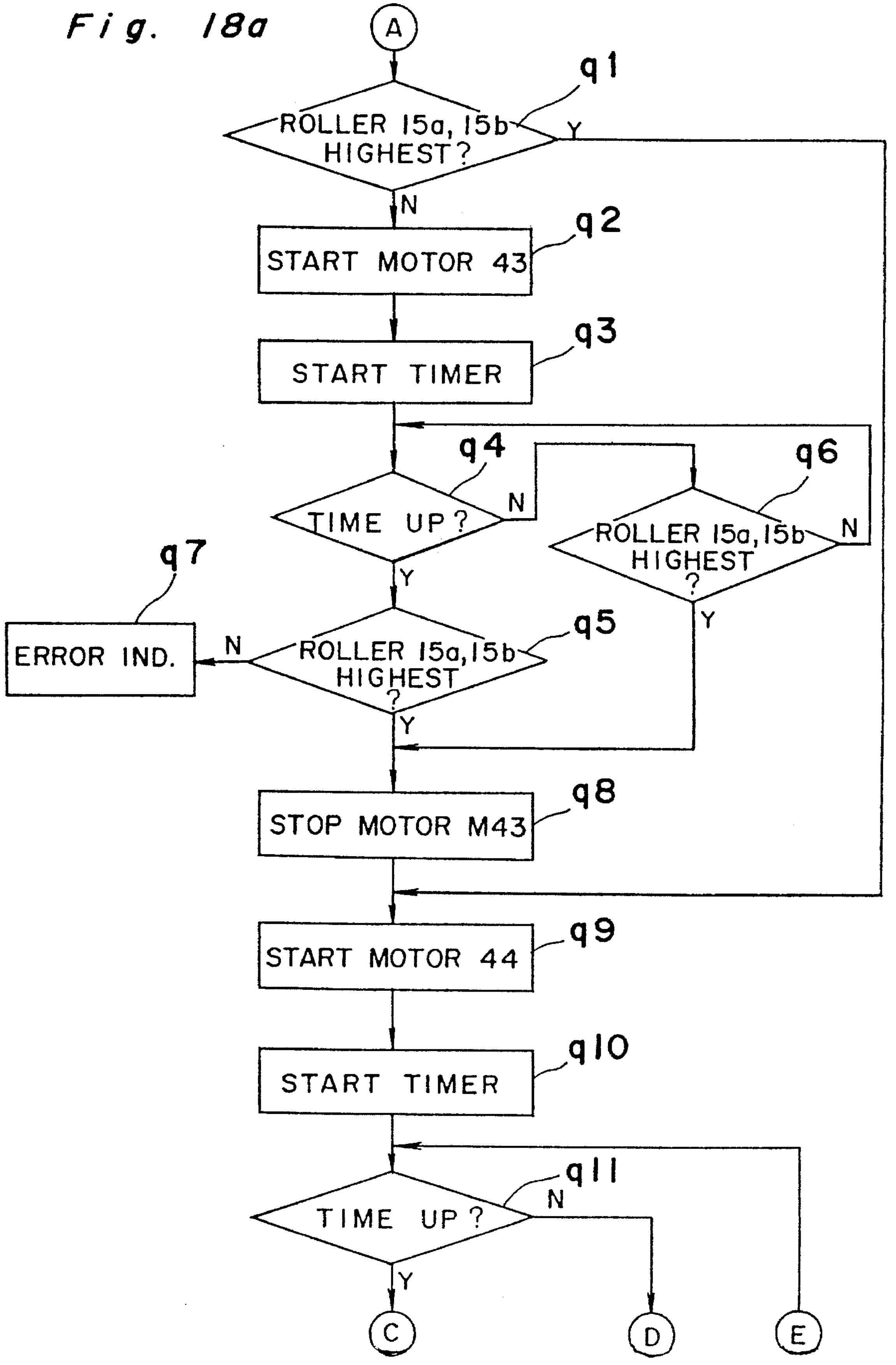
Figure 18B:
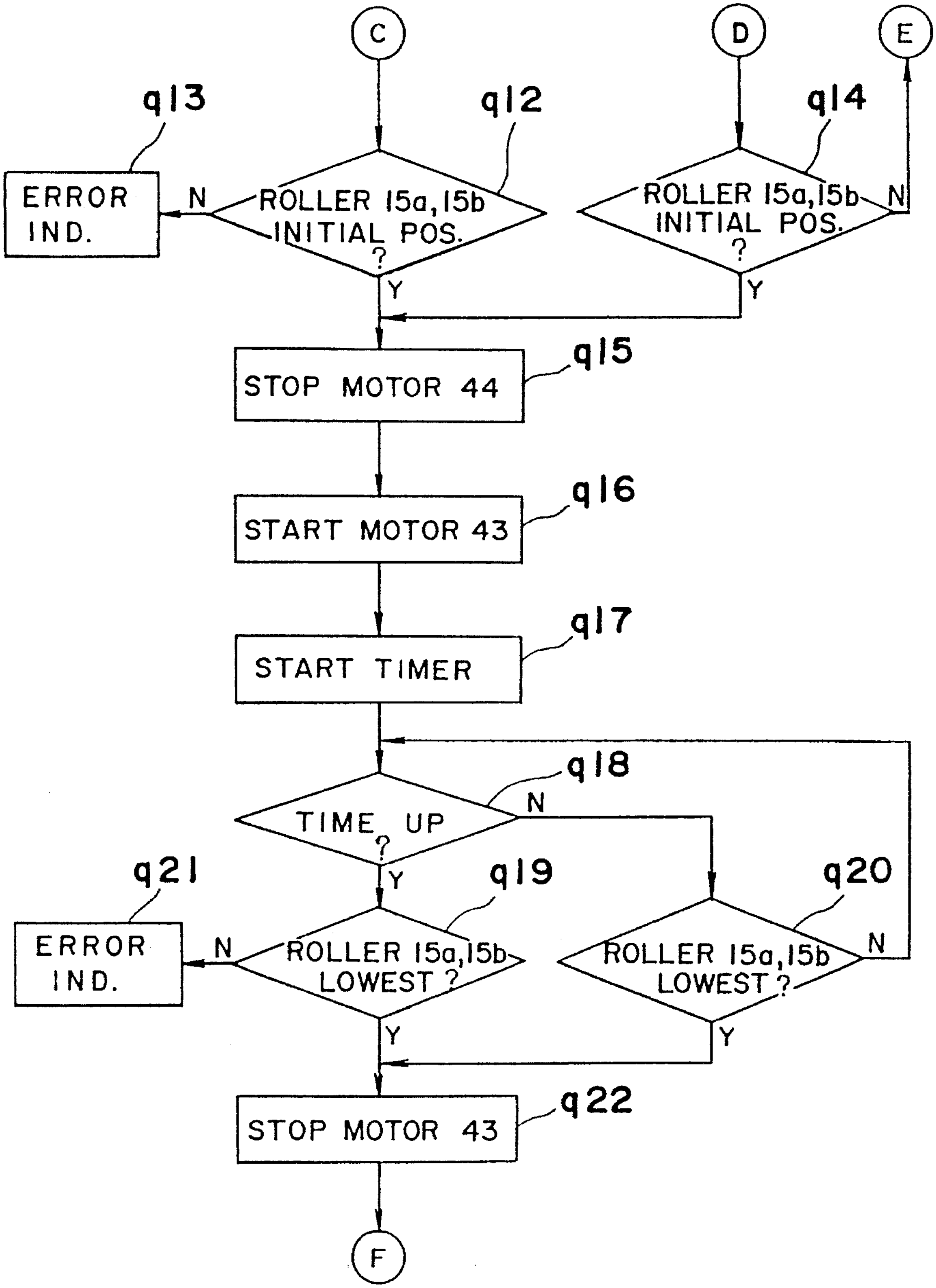

The operation of the film feed mechanism will be explained hereinafter with reference to FIG. 10 and a flow-chart shown in FIGS. 18*a* and 18*b*.

The sensor 42 judges at step q1 whether or not the feed rollers 15*a* or 15*b* are located at their highest position. If none of the tilt plate 51 and the film guide plate 50 is located at their highest position, the motor 43 for driving the guide plate driving shaft 48 is reversed at step q2 and a timer is started at step q3 so that the feed roller assembly 15 including the feed rollers 15*a* and 15*b* may be moved upwards by tilting both the tilt plate 51 and the film guide plate 50. The timer is generally set to a value slightly greater than the time required for moving the feed mechanism from its lowest position to its highest position. When the timer is up at step q4, it is judged at step q5 whether or not the feed roller assembly 15 is located at its highest position. In this event, if the feed mechanism is out of order and the feed roller assembly 15 is not located at its highest position, an error indication is provided at step q7 and the reverse rotation of the motor 43 is stopped. If the timer is not up at step q4, it is Judged at step q6 whether or not the feed roller assembly 15 is located at its highest position. If the Judgment at step q5 or q6 is YES, the motor 43 is stopped at step q8. Thereafter, the motor 44 for driving the roller shaft driving shaft 47 is started at step q9 followed by step q10 at which a timer is started. This timer is generally set to a value slightly greater than the time required for one rotation of the feed roller assembly 15. It is then judged at step q11 whether or not the timer is up. If the timer is up, it is judged at step q12 whether or not the feed roller assembly 15 is at its initial position. In contrast, if the timer is not up, such judgment is performed at step q14. When the feed roller assembly 15 is at its initial position, the microswitch 45 for detecting the position of the roller shaft 46 is turned on by the rotary plate 55 fixed to the roller shaft 46. If the feed roller assembly 15 is not properly driven and not at its initial position, the motor 44 is stopped and an error indication is provided at step q13. If the feed roller assembly 15 is located at its initial position at step q12 or q14, the motor 44 is stopped at step q15.

Subsequently, the motor 43 is rotated at step q16 so that the feed mechanism may move downwards, and a timer is started at step q17 followed by step q18 at which it is judged whether or not the timer is up. If the timer is up, it is judged at step q19 whether or not the feed roller assembly 15 is located at its lowest position. When the feed roller assembly 15 is located at its lowest position, the sensor 41 is activated. In contrast, if the timer is not up, such judgment is performed at step q20. When the feed roller assembly 15 is located at its lowest position, the motor 43 is stopped at step q22. If the feed roller assembly 15 does not reach its lowest position at step q19 until the timer is up, it is judged that the feed mechanism is out of order. Thereafter, the motor 43 is immediately stopped and an error indication is provided at step q22. In this way, the film feed mechanism becomes operable.

Figure 19:
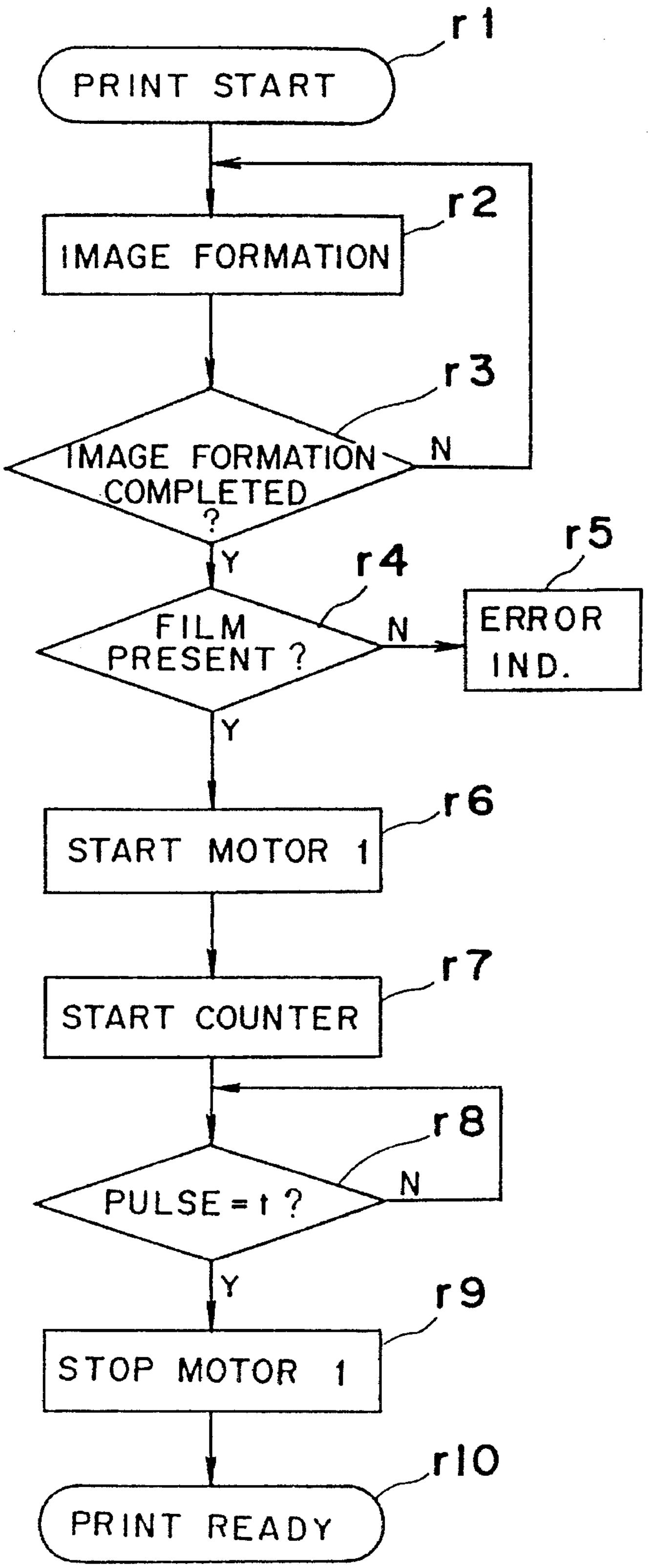

The operation during the printing is shown in a flow-chart of FIG. 19.

Upon depression of a print button (not shown) or upon input of a certain signal, the printing is initiated at step r1 followed by step r2 at which an image is formed on a film in the sub-scanning portion D by laser beams modulated by the optical recording device A. It is then judged at step r3 whether or not the image formation is completed. Upon completion of the image formation, the photosensor 9 for detecting the height of the film stack 7 detects at step r4 whether or not any film still remains in the film cassette 10. If no film remains in the film cassette 10, an error indication indicative of the absence of film is provided at step r5. In contrast, if at least one film still remains in the film cassette 10, the motor 1 is rotated at step r6 followed by step r7 at which a pulse counter is started. When the pulse counter counts a predetermined number t of pulse corresponding to the thickness of one film at step r8, the motor 1 is stopped at step r9. Under such conditions, the topmost one of films 7 charged in the cassette box 14 can be fed. In this way, preparations for the next printing is completed at step r10.

Figure 20:
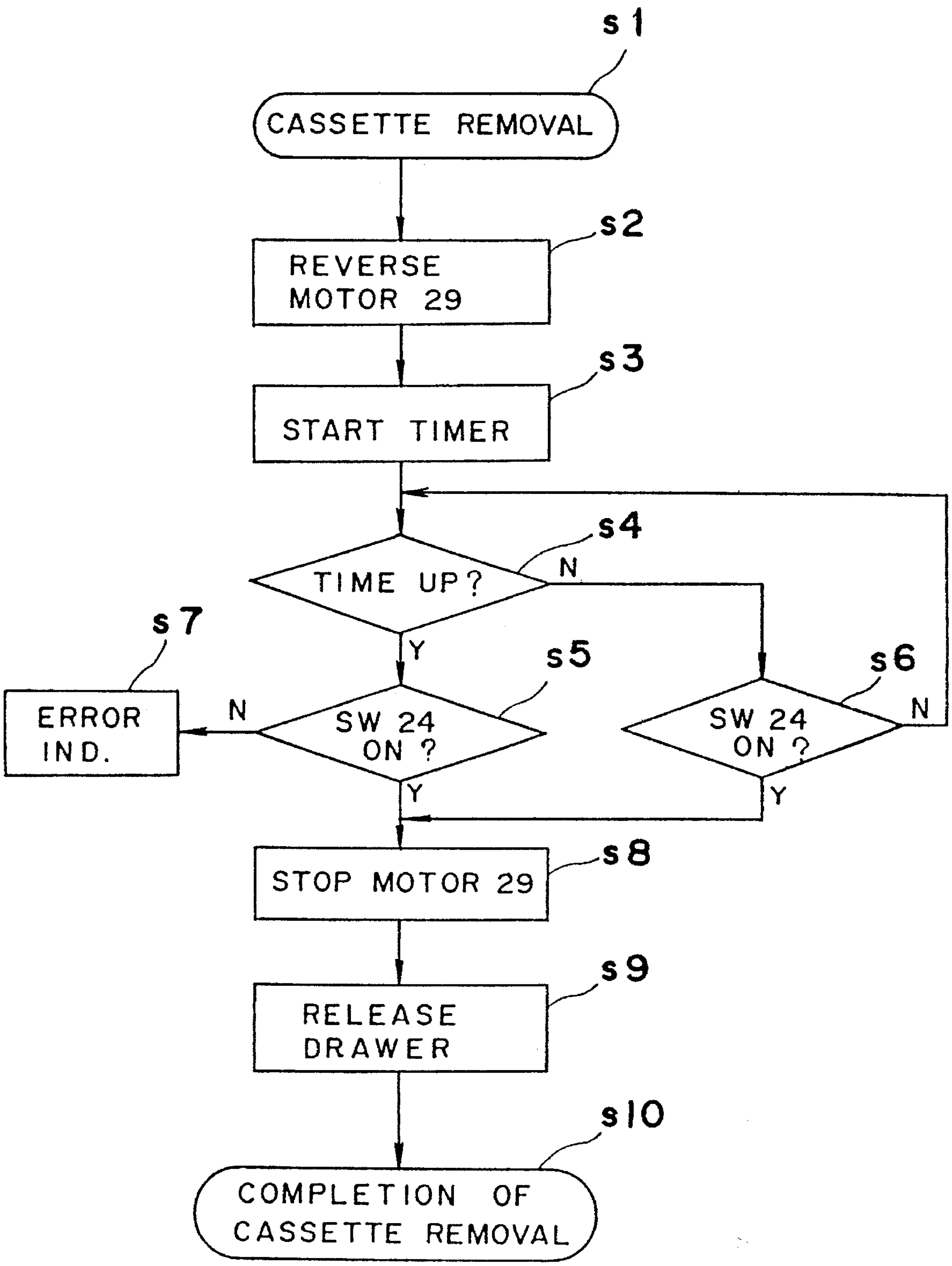

The film cassette 10 can be removed from the printer in the manner as shown in a flow-chart of FIG. 20.

When the film cassette 10 is removed from the printer, a cassette removal button (not shown) is initially depressed at step s1. The motor 29 for driving the take-up roller 22 is reversed at step s2 so that the take-up roller 22 may rotate in a direction required for rewinding the cassette cover 18. At subsequent step s3, a timer is started which is set to a value slightly greater than the time required for the normal rewinding operation. It is judged at step s4 whether or not the timer is up. If the timer is up, the microswitch 24 judges at step s5 whether or not the roller supports 25 together with the take-up roller 22 have been returned to their initial position. In contrast, if the timer is not up, this judgment is performed at step s6. In this event, the photosensor 23 for detecting the end position of the roller supports 25 must be kept off in order that the cassette cover 18 would entirely shield the cassette box 14. If the cassette cover 18 does not close the opening 14*c* formed in the flange 14*a* of the cassette box 14 after the timer is up, it is Judged that an error has happened. In this case, the motor 29 is immediately stopped and an error indication is provided at step s7.

When the microswitch 24 detects the initial position of the take-up roller 22, the reverse rotation of the motor 29 is stopped at step s8 followed by step s9 at which the lock solenoid 34 is activated to release the drawer 38. In this way, the drawer 38 can be opened and the film cassette 10 can be removed from the drawer 38 at step s10.

Figure 21:
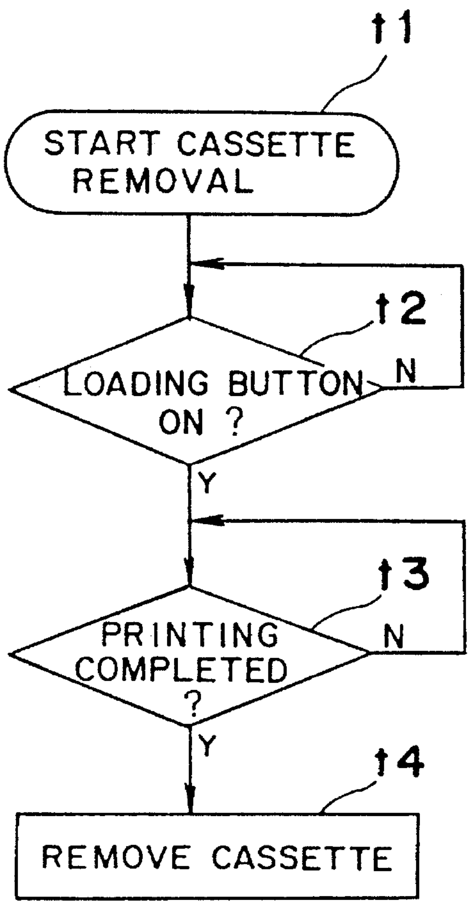

FIG. 21 depicts a flow-chart indicative of a routine for always detecting at regular time intervals whether or not the film cassette 10 can be removed from the printer 21, independently of a routine on the basis of the main flowchart of FIG. 15.

More specifically, the detection as to whether or not the film cassette 10 can be removed from the printer 21 is initiated at step t1 followed by step t2 at which it is judged whether a cassette loading button (not shown) is on or off. If the cassette loading button is on, it is judged at step t3 whether or not the printing is completed. When the printing is completed, the film cassette 10 can be removed from the printer 21 at step t4.

It is noted that in the above described embodiment, although film sheets are employed as photosensitive materials, photosensitive papers such as photographic printing papers can be also used.

Furthermore, the present invention can be applied to a printer employing therein non-photosensitive sheet materials such as papers for PPC (plane paper copier) use, surface treated papers for sublimation type thermal transfer use, transparent films for OHP (overhead projector) use or the like, as well as a printer employing therein photosensitive films.

In addition, although a roller feed system is employed in the above described embodiment, a suction type sheet feed system can be also employed.

It is also noted that the present invention can be applied to an image forming apparatus such as a copier, a facsimile device or the like.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An image forming apparatus employing therein a sheet cassette which accommodates a plurality of sheet materials and has an opening covered with a sheet cover, said apparatus comprising:

take-up means movable above said sheet cover for winding said sheet cover;

support means for rotatably supporting said take-up means, said support means being movable in a direction longitudinally of said sheet cassette;

a driving mechanism for moving said support means and for rotating said take-up means; and control means for operating said driving mechanism so that said take-up means can wind said sheet cover after said sheet cassette has been charged in said apparatus.

2. The apparatus according to claim 1, wherein said driving mechanism causes a traveling speed of said support means to be greater than a rotating speed of said take-up means.

3. The apparatus according to claim 1, further comprising means for detecting that said sheet cassette has been charged in said apparatus, wherein said control means causes said take-up means to wind said sheet cover when said detecting means detects the charge of said sheet cassette.

4. The apparatus according to claim 1, further comprising means for detecting a size of sheet materials accommodated in said sheet cassette, wherein said control means changes an amount of winding of said take-up means in accordance with the size of sheet materials detected by said size detecting means.

5. The apparatus according to claim 4, wherein said size detecting means detects the size of sheet materials during the charge of said sheet cassette.

6. The apparatus according to claim 1 wherein the sheet cover has a portion extending outward from the cassette and coated with adhesive and the take-up means includes a member capable of contacting the coated adhesive to enable a winding of said sheet cover.

7. An image forming apparatus employing therein a sheet cassette which accommodates a plurality of sheet materials and has an opening covered with a sheet cover, said apparatus comprising:

take-up means movable above said sheet cover for winding said sheet cover;

support means for rotatably supporting said take-up means, said support means being movable in a direction longitudinally of said sheet cassette;

a driving mechanism for moving said support means and for rotating said take-up means;

means for detecting that said take-up means is located at an initial position thereof where said take-up means is allowed to start winding; and control means for moving said take-up means to said initial position so that said take-up means is caused to start winding when said detecting means cannot detect said take-up means even after said sheet cassette has been charged in said apparatus.

8. The apparatus according to claim 7, further comprising means for detecting that said take-up means is located at an end position thereof where said take-up means completes the winding, wherein said control means stops the take-up means when said end position detecting means cannot detect said take-up means within a predetermined period of time after the winding has been started.

9. The apparatus according to claim 7 wherein the sheet cover has a portion extending outward from the cassette and coated with adhesive and the take-up means includes a member capable of contacting the coated adhesive to enable a winding of said sheet cover.

10. An image forming apparatus employing therein a sheet cassette which accommodates a plurality of sheet materials and has an opening covered with a sheet cover, said apparatus comprising:

take-up means including a roller member engageable with and movable above said sheet cover for winding said sheet cover about said roller member;

support means for rotatably supporting said roller member, said support means being movable in a direction longitudinally of said sheet cassette;

a driving mechanism for moving said support means and for rotating said roller member;

means for detecting a size of sheet material accommodated in said sheet cassette; and control means for operating said driving mechanism so that said take-up means can wind said sheet cover after said sheet cassette has been charged in said apparatus in accordance with the size of sheet materials detected by said size detecting means.

11. The apparatus according to claim 10 wherein said means for detecting a size of sheet material includes a photosensor that can read a bar code on a sheet cassette.

12. An image forming apparatus employing therein a sheet cassette which accommodates a plurality of sheet materials and has an opening with a sheet cover, comprising:

a roller member attachable to the sheet cover;

means for rotating the roller member while simultaneously translating the roller member across the sheet cover to wind the sheet cover about the roller member to open the sheet cassette in one direction and to unwind the sheet cover from the roller member in the other direction to close the sheet cassette;

timing means for setting a predetermined time period for the translating movement of the roller member; and indicator means to provide a signal when the predetermined time period expires before terminating of the translating movement of the roller member.

13. The apparatus according to claim 12 further including means for detecting when said roller member is located at an initial position to enable attachment to the sheet cover.

14. An image forming apparatus employing therein a sheet cassette which accommodates a plurality of sheet materials and has an opening covered with a sheet cover, said apparatus comprising:

take-up means movable above said sheet cover for winding said sheet cover;

support means for rotatably supporting said take-up means, said support means being movable in a direction longitudinally of said sheet cassette;

driving mechanism for moving said support means and for rotating said take-up means;

detecting means for detecting whether or not said take-up means is located at an initial position; and control means for operating said driving mechanism so that take-up means is caused to start winding said sheet cover when said detecting means detects that the take-up means is located at an initial position, and for stopping said driving mechanism so that the take-up means is not caused to start winding said sheet cover when said detecting means does not detect that the take-up means is located at an initial position.

15. The apparatus according to claim 14, further comprising warning means for warning that an error occurs when said detecting means does not detect that the take-up means is located at an initial position.

16. The apparatus according to claim 14, wherein said driving mechanism is composed of a motor as the driving source, a gear assembly and a guide member for guiding said support means.

17. The apparatus according to claim 14, wherein the take-up means includes a take-up roller extending over the latitude of said cassette case.

18. The apparatus according to claim 14, further comprising a support member for supporting a lip of said sheet cassette.

19. An image forming apparatus employing therein a sheet cassette which accommodates a plurality of sheet materials and has an opening covered with a sheet cover, said apparatus comprising:

take-up means movable above said sheet cover for winding said sheet cover;

support means for rotatably supporting said take-up means, said support means being movable in a direction longitudinally of said sheet cassette;

a driving mechanism for moving said support means for rotating said take-up means;

first detecting means for detecting that said take-up means located at an initial position; and second detecting means for detecting that said take-up means is located at an end position.

20. The apparatus according to claim 19, wherein said driving mechanism causes said take-up means to rotate in a first direction in order to open said sheet cassette when said first detecting means detects that said take-up means is located at an initial position, and in a second direction in order to cover said sheet cassette when said second detecting means detects that said take-up means is located at an end position.

* * * * *